(12) United States Patent
Ishida

(10) Patent No.: US 11,070,124 B2
(45) Date of Patent: Jul. 20, 2021

(54) POWER CONVERSION DEVICE

(71) Applicant: Mitsubishi Electric Corporation, Tokyo (JP)

(72) Inventor: Keisuke Ishida, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/349,884

(22) PCT Filed: Nov. 21, 2016

(86) PCT No.: PCT/JP2016/084424
§ 371 (c)(1),
(2) Date: May 14, 2019

(87) PCT Pub. No.: WO2018/092303
PCT Pub. Date: May 24, 2018

(65) Prior Publication Data
US 2020/0083799 A1 Mar. 12, 2020

(51) Int. Cl.
*H02M 1/32* (2007.01)
*H02M 7/483* (2007.01)
(Continued)

(52) U.S. Cl.
CPC .............. *H02M 1/32* (2013.01); *H02H 3/087* (2013.01); *H02H 7/125* (2013.01); *H02M 1/36* (2013.01);
(Continued)

(58) Field of Classification Search
CPC .......... H02M 1/32; H02M 7/53; H02M 7/537; H02M 7/5387; H02M 7/5388; H02M 1/36;
(Continued)

(56) References Cited

U.S. PATENT DOCUMENTS

2013/0233115 A1 8/2013 Tsuchiya et al.
2016/0126880 A1* 5/2016 Choi ...................... H02P 27/06
318/503

FOREIGN PATENT DOCUMENTS

EP 2905889 A1 8/2015
JP 2014207728 A 10/2014
(Continued)

OTHER PUBLICATIONS

International Search Report (PCT/ISA/210) dated Dec. 27, 2016, by the Japan Patent Office as the International Searching Authority for International Application No. PCT/JP2016/084424.
(Continued)

*Primary Examiner* — Gary L Laxton
(74) *Attorney, Agent, or Firm* — Buchanan Ingersoll & Rooney PC

(57) ABSTRACT

A power conversion device in one embodiment includes power conversion circuitry having a plurality of converter cells connected in series to each other. Each converter cell includes an energy storage device and is configured to be capable of discharging stored energy. A control device is configured to generate a control command for controlling operation of each converter cell. A protection device is configured to generate a protection command for instructing whether to cause each converter cell to operate based on the control command or to stop operation of each converter cell regardless of the control command. A repeating device is configured to generate a control-and-protection command that is a combination of control information based on the control command and protection information based on the protection command, and output the generated control-and-protection command to each converter cell.

15 Claims, 19 Drawing Sheets

(51) Int. Cl.
   *H02H 3/087*    (2006.01)
   *H02H 7/125*    (2006.01)
   *H02M 1/36*     (2007.01)
   *H02M 5/458*    (2006.01)
   *H02M 7/797*    (2006.01)
   *H02M 1/00*     (2006.01)

(52) U.S. Cl.
   CPC ........... *H02M 5/458* (2013.01); *H02M 7/483* (2013.01); *H02M 7/797* (2013.01); *H02M 2001/0003* (2013.01); *H02M 2001/0077* (2013.01); *H02M 2007/4835* (2013.01)

(58) Field of Classification Search
   CPC ...... H02M 5/458; H02M 5/483; H02M 7/797; H02M 2001/0003; H02M 2001/0077; H02M 2007/4835; H02H 3/087; H02H 7/125
   See application file for complete search history.

(56) References Cited

FOREIGN PATENT DOCUMENTS

| | | |
|---|---|---|
| JP | 2015130746 A | 7/2015 |
| JP | 2015142466 A | 8/2015 |
| WO | 2014111595 A1 | 7/2014 |
| WO | 2015121983 A1 | 8/2015 |
| WO | 2016167117 A1 | 10/2016 |

OTHER PUBLICATIONS

Written Opinion (PCT/ISA/237) dated Dec. 27, 2016, by the Japan Patent Office as the International Searching Authority for International Application No. PCT/JP2016/084424.

Extended European Search Report dated Dec. 5, 2019 by the European Patent Office in corresponding European Patent Application No. 16921680.1-1201, 9 pages.

* cited by examiner

POWER CONVERSION DEVICE

TECHNICAL FIELD

The present disclosure relates to a power conversion device converting AC power into DC power and vice versa.

BACKGROUND ART

The Modular Multilevel Converter (MMC) is known as a large-capacity power conversion device connected to an electric power system. The Modular Multilevel Converter includes, for each phase of AC, an upper arm connected to a high-potential-side DC terminal and a lower arm connected to a low-potential-side DC terminal. Each arm is made up of a plurality of cascaded converter cells.

When it is detected that overcurrent due to a fault in the electric power system for example flows in any of the arms, a stop command to turn off semiconductor switching devices constituting each converter cell has to be transmitted as promptly as possible to the converter cell, in order to prevent circuit failure.

For example, Japanese Patent Laying-Open No. 2014-207728 (PTL 1) discloses an example of a configuration for transmitting a stop command to each converter cell. Specifically, a power conversion device of above-referenced PTL 1 includes an arm voltage command value generation unit, an overcurrent detection unit, and a communication interface unit. The arm voltage command value generation unit generates and outputs a command value for a converter cell. The overcurrent detection unit detects overcurrent flowing in each arm. Based on the command value generated by the arm voltage command value generation unit, the communication interface unit transmits an operation command frame to each converter cell at predetermined intervals. When the overcurrent detection unit detects overcurrent, the communication interface unit transmits a stop command frame to each converter cell, regardless of the predetermined intervals, in order to cause an emergency stop.

CITATION LIST

Patent Literature

PTL 1: Japanese Patent Laying-Open No. 2014-207728

SUMMARY OF INVENTION

Technical Problem

In the power conversion device disclosed in PTL 1, the operation command frame is transmitted from a control device to each converter cell during normal operation. When overcurrent is detected, the stop command frame is transmitted from the control device to each converter cell, instead of the operation command frame. It would therefore be necessary for the communication interface unit to perform a process for switching the signal frame to be transmitted to each converter cell, depending on whether overcurrent is detected or not.

When overcurrent is detected, it is also necessary for each converter cell receiving the stop command frame to process the signal having a different frame structure from that during normal operation. It would be further necessary for each converter cell to perform a process for confirming whether the received stop command frame is an error signal or not.

In the above-described respects, the signal processing in the power conversion device of PTL 1 for transmitting the stop command to each converter cell upon detecting overcurrent is relatively complicated. Accordingly, there appears to be some room for improvement, for transmitting the stop command to each converter cell as quickly as possible upon detecting overcurrent.

One of the objects of the present disclosure is to provide a power conversion device capable of transmitting a stop command to each converter cell as quickly as possible upon detecting overcurrent.

Solution to Problem

A power conversion device in one embodiment includes power conversion circuitry, a control device, a protection device, and a repeating device. The power conversion circuitry includes a plurality of converter cells connected in series to each other. Each of the converter cells includes an energy storage device and is configured to be capable of discharging stored energy. The control device is configured to generate a control command for controlling operation of each of the converter cells. The protection device is configured to generate a protection command for instructing whether to cause each of the converter cells to operate based on the control command or to stop operation of each of the converter cells regardless of the control command. The repeating device is configured to generate a control-and-protection command that is a combination of control information based on the control command and protection information based on the protection command, and output the generated control-and-protection command to each of the converter cells.

Advantageous Effects of Invention

The power conversion device in the embodiment described above can combine the control information based on the control command with the protection information based on the protection command to thereby generate the control-and-protection command through the same signal processing regardless of whether overcurrent is detected or not, and then output the generated control-and-protection command to each converter cell. Therefore, upon detection of overcurrent, the stop command can be transmitted to each converter cell as quickly as possible.

DESCRIPTION OF EMBODIMENTS

Figure 1:
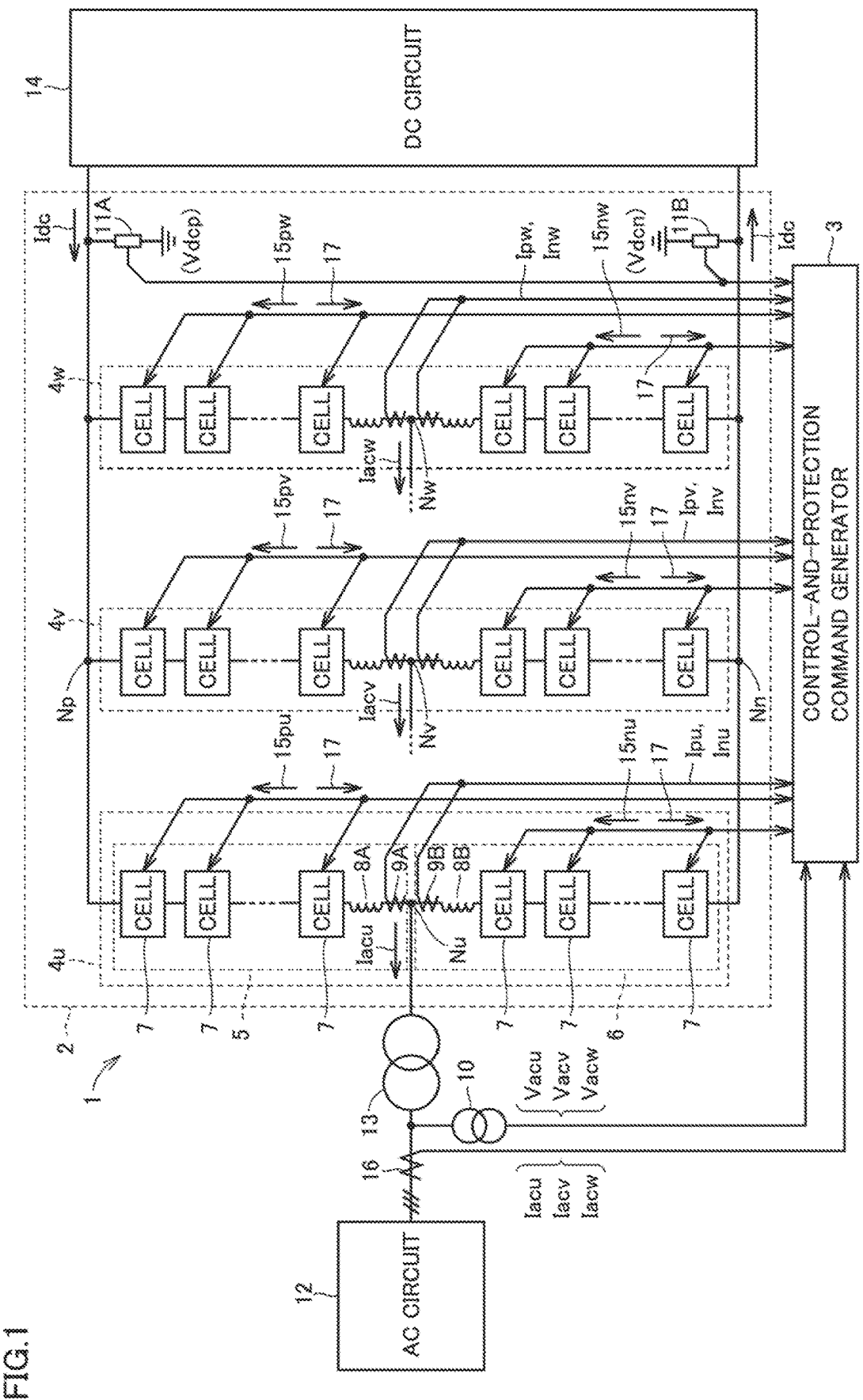
FIG. 1 is a schematic configuration diagram of a power conversion device in Embodiment 1.

In the following, each embodiment is described in detail with reference to the drawings. The same or corresponding parts are denoted by the same reference characters, and a description thereof is not repeated.

Embodiment 1

[Schematic Configuration of Power Conversion Device]

FIG. 1 is a schematic configuration diagram of a power conversion device in Embodiment 1. Referring to FIG. 1, power conversion device 1 includes leg circuits 4u, 4v, 4w (may be referred to non-specifically as leg circuit 4) that are main circuits, and a control-and-protection command generator 3. The whole of leg circuits 4u, 4v, 4w is referred to herein as power conversion circuitry 2.

Leg circuit 4 is provided for each of a plurality of phases of AC, and connected between an AC circuit 12 and a DC circuit 14 for performing power conversion between the AC circuit and the DC circuit. AC circuit 12 shown in FIG. 1 is a three-phase AC circuit, and three leg circuits 4u, 4v, and 4w are arranged for U phase, V phase, and W phase, respectively.

AC terminals Nu, Nv, Nw arranged respectively in leg circuits 4u, 4v, 4w are each connected through an interconnection transformer 13 to AC circuit 12. AC circuit 12 is an AC power system including an AC power source, for example. FIG. 1 does not show connection between AC terminals Nv, Nw and interconnection transformer 13 for the sake of simplifying the drawing.

DC terminals Np, Nn (specifically high-potential-side DC terminal Np, low-potential-side DC terminal Nn) that are provided commonly to leg circuits 4 are connected to DC circuit 14. DC circuit 14 is a DC terminal for a DC power system including a DC transmission network or the like, or a DC terminal for another power conversion device. In the latter case, the two power conversion devices are coupled together to form a BTB (Back To Back) system for connecting AC power systems that are different from each other in the rated frequency, for example.

The leg circuits may be connected to AC circuit 12 through an interconnection reactor, instead of interconnection transformer 13 in FIG. 1. Further, instead of AC terminals Nu, Nv, Nw, primary windings may be arranged in respective leg circuits 4u, 4v, 4w, and AC connection from leg circuits 4u, 4v, 4w to interconnection transformer 13 or the interconnection reactor may be implemented through secondary windings magnetically coupled with the respective primary windings. In this case, the primary windings may be reactors 8A, 8B as described below. Specifically, electrical connection, namely DC or AC connection, from leg circuit 4 to AC circuit 12 may be implemented through connecting parts such as AC terminals Nu, Nv, Nw or the aforementioned primary windings arranged in respective leg circuits 4u, 4v, 4w.

Leg circuit 4u includes an upper arm 5 from high-potential-side DC terminal Np to AC input terminal Nu, and a lower arm 6 from low-potential-side DC terminal Nn to AC input terminal Nu. The connection point (i.e., AC terminal Nu) between upper arm 5 and lower arm 6 is connected to transformer 13. High-potential-side DC terminal Np and low-potential-side DC terminal Nn are connected to DC circuit 14. Leg circuits 4v, 4w have a similar configuration to the above-described one, and therefore, leg circuit 4u is explained below as a representative of the leg circuits.

Upper arm 5 includes a plurality of cascaded converter cells 7 and reactor 8A. A plurality of converter cells 7 and reactor 8A are connected in series to each other. In the following, converter cell 7 may be referred to as cell 7 for the sake of simplicity.

Likewise, lower arm 6 includes a plurality of cascaded cells 7 and reactor 8B. A plurality of cells 7 and reactor 8B are connected in series to each other.

The position in which reactor 8A is inserted may be any position in upper arm 5 of leg circuit 4u, and the position in which reactor 8B is inserted may be any position in lower arm 6 of leg circuit 4u. More than one reactor 8A and more than one reactor 8B may be arranged. Respective inductance values of the reactors may be different from each other. Alternatively, only reactor 8A of upper arm 5, or only reactor 8B of lower arm 6 may be arranged.

Reactors 8A, 8B are arranged for preventing a sharp increase of fault current generated in the event of a fault in AC circuit 12 or DC circuit 14, for example. Excessively large inductance values of reactors 8A, 8B, however, result in a problem that the efficiency of the power conversion device is decreased. A protective operation of turning off all switching devices in all cells 7 as quickly as possible is therefore important.

Power conversion device 1 in FIG. 1 further includes, as detection devices for measuring the amount of electricity (current, voltage, for example) to be used for control, an AC voltage detection device 10, an AC current detection device 16, DC voltage detection devices 11A, 11B, and arm current detection devices 9A, 9B disposed in each leg circuit 4. Signals detected by these detection devices are input to control-and-protection command generator 3. Based on these detected signals, control-and-protection command generator 3 outputs control-and-protection commands 15pu, 15nu, 15pv, 15nv, 15pw, 15nw for controlling the operating states of respective cells 7. Control-and-protection command generator 3 also receives, from each cell 7, a signal 17 representing a detected value of the cell capacitor voltage.

In the present embodiment, control-and-protection commands 15$pu$, 15$nu$, 15$pv$, 15$nv$, 15$pw$, and 15$nw$ are generated for the U phase upper arm, the U phase lower arm, the V phase upper arm, the V phase lower arm, the W phase upper arm, and the W phase lower arm, respectively. In the following, control-and-protection commands 15$pu$, 15$nu$, 15$pv$, 15$nv$, 15$pw$, 15$nw$ may be referred to collectively or non-specifically as control-and-protection command 15.

For the sake of simplifying the drawing, FIG. 1 shows collectively some of signal lines for signals that are input from respective detection devices to control-and-protection command generator 3 and signal lines for signals that are input or output between control-and-protection command generator 3 and respective cells 7. Actually, however, the signal line is disposed individually for each detection device and each cell 7. The signal line between each cell 7 and control-and-protection command generator 3 may be provided as separate transmission line and reception line. In the present embodiment, these signals are transmitted through optical fibers for the sake of noise immunity.

In the following, each detection device is described specifically. AC voltage detection device 10 detects U phase voltage value Vacu, V phase voltage value Vacv, and W phase voltage value Vacw of AC circuit 12. AC current detection device 16 detects U phase current value Iacu, V phase current value Iacv, and W phase current value Iacw of AC circuit 12. DC voltage detection device 11A detects the voltage of high-potential-side DC terminal Np connected to DC circuit 14. DC voltage detection device 11B detects the voltage of low-potential-side DC terminal Nn connected to DC circuit 14. Arm current detection devices 9A, 9B disposed in U phase leg circuit 4$u$ detect arm current Ipu flowing in upper arm 5 and arm current Inu flowing in lower arm 6, respectively. Likewise, arm current detection devices 9A, 9B disposed in V phase leg circuit 4$v$ detect upper arm current Ipv and lower arm current Inv, respectively. Arm current detection devices 9A, 9B disposed in W phase leg circuit 4$w$ detect upper arm current Ipw and lower arm current Inw, respectively.

Example Configuration of Converter Cell

Figure 2:
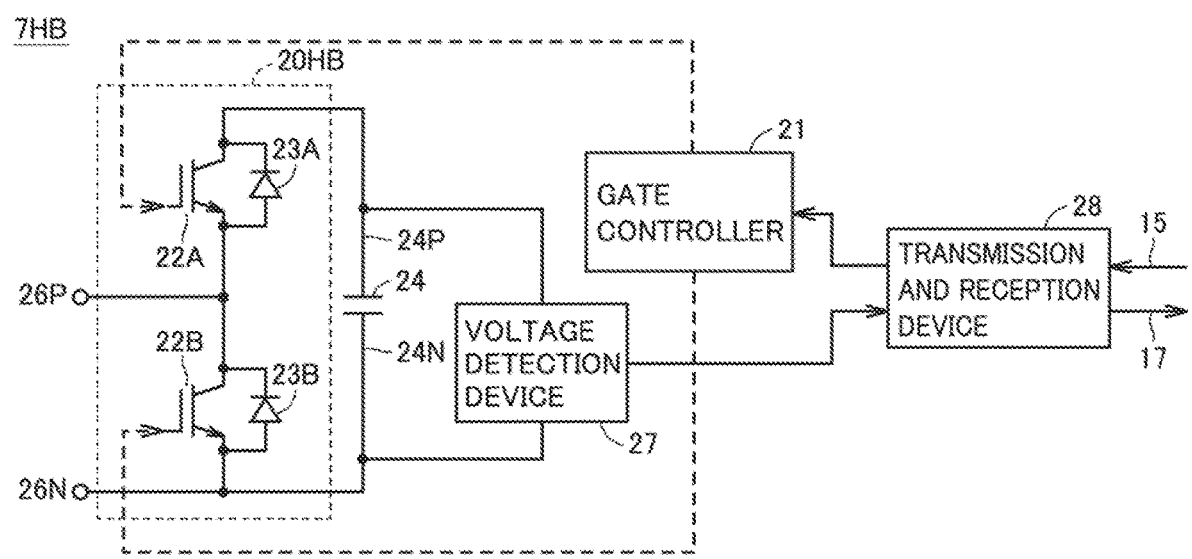
FIG. 2 is a circuit diagram showing an example of a converter cell which is a component of each leg circuit in FIG. 1.

FIG. 2 is a circuit diagram showing an example of the converter cell which is a component of each leg circuit in FIG. 1. A converter cell 7FB shown in FIG. 2 includes a half-bridge-type conversion circuit 20HB, a DC capacitor 24 serving as an energy storage device, a gate controller 21, a voltage detection device 27, and a transmission and reception device 28.

Half-bridge-type conversion circuit 20HB includes semiconductor switching devices 22A, 22B (may be referred to simply as switching device hereinafter) connected in series to each other, and diodes 23A, 23B. Diodes 23A, 23B are connected in anti-parallel (i.e., in parallel in the reverse-bias direction) with switching devices 22A, 22B, respectively. DC capacitor 24 is connected in parallel with the series-connected circuit made up of switching devices 22A, 22B for holding a DC voltage. A connection node of switching devices 22A, 22B is connected to a high-potential-side input/output terminal 26P. A connection node of switching devices 22B and DC capacitor 24 is connected to a low-potential-side input/output terminal 26N.

Gate controller 21 operates in accordance with control-and-protection command 15 received from control-and-protection command generator 3 in FIG. 1. During a normal operation (i.e., zero voltage or positive voltage is output between input/output terminals 26P and 26N), gate controller 21 performs control to cause one of switching devices 22A, 22B to be in the ON state and the other to be in the OFF state. While switching device 22A is in the ON state and switching device 22B is in the OFF state, a voltage across DC capacitor 24 is applied between input/output terminals 26P and 26N. On the contrary, while switching device 22A is in the OFF state and switching device 22B is in the ON state, the voltage between input/output terminals 26P and 26N is 0 V. Thus, converter cell 7 shown in FIG. 2 can cause switching devices 22A, 22B to become the ON state alternately to thereby output zero voltage or a positive voltage depending on the voltage of DC capacitor 24. Diodes 23A, 23B are provided for the sake of protection when a reverse-direction voltage is applied to switching devices 22A, 22B.

In contrast, when control-and-protection command generator 3 in FIG. 1 detects that the arm current is overcurrent, gate controller 21 turns off both switching devices 22A, 22B for the sake of circuit protection. Accordingly, in the event of a ground fault of DC circuit 14, for example, fault current flows through diode 23B.

Voltage detection device 27 detects the voltage between opposite terminals 24P and 24N of DC capacitor 24. In the following, the voltage of DC capacitor 24 is also referred to as cell capacitor voltage. Transmission and reception device 28 transmits, to gate controller 21, control-and-protection command 15 received from control-and-protection command generator 3 in FIG. 1, and transmits, to control-and-protection command generator 3, a signal 17 representing the cell capacitor voltage detected by voltage detection device 27.

Above-described gate controller 21, voltage detection device 27, and transmission and reception device 28 may be implemented by a dedicated circuit, or implemented by an FPGA (Field Programmable Gate Array), or the like.

Figure 3:
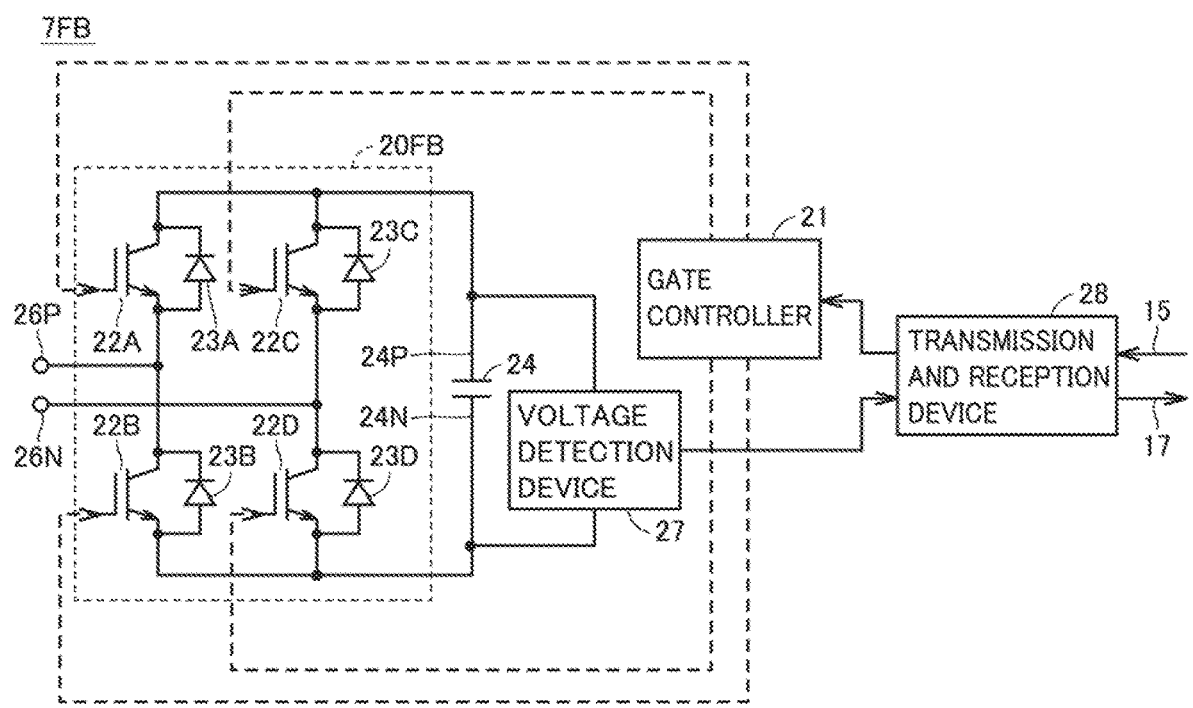
FIG. 3 is a circuit diagram showing another example of a converter cell which is a component of each leg circuit in FIG. 1.

FIG. 3 is a circuit diagram showing another example of the converter cell which is a component of each leg circuit in FIG. 1. A converter cell 7FB shown in FIG. 3 includes a full-bridge-type conversion circuit 20FB, a DC capacitor 24 serving as an energy storage device, a gate controller 21, a voltage detection device 27, and a transmission and reception device 28.

Full-bridge-type conversion circuit 20FB differs from converter cell 7HB shown in FIG. 2 in that the former further includes series-connected switching devices 22C, 22D and diodes 23C, 23D connected in anti-parallel with switching devices 22C, 22D, respectively. The whole of switching devices 22C, 22D is connected in parallel with the series-connected circuit made up of switching devices 22A, 22B, and connected in parallel with DC capacitor 24. Input/output terminal 26P is connected to a connection node of switching devices 22A, 22B, and input/output terminal 26N is connected to a connection node of switching devices 22C, 22D.

Gate controller 21 operates in accordance with control-and-protection command 15 received from control-and-protection command generator 3 in FIG. 1. During a normal operation (i.e., zero voltage or positive voltage is output between input/output terminals 26P and 26N), gate controller 21 performs control to cause switching device 22D to be kept ON, switching device 22C to be kept OFF, and switching devices 22A, 22B to become the ON state alternately. Full-bridge-type conversion circuit 20FB shown in FIG. 3 can also output zero voltage or a negative voltage (so-called reverse voltage) by causing switching device 22D to be OFF, switching device 22C to be ON, and switching devices 22A, 22B to become the ON state alternately.

In contrast, when control-and-protection command generator 3 in FIG. 1 detects that the arm current is overcurrent, gate controller 21 turns off all of switching devices 22A to 22D for the sake of circuit protection. In this case, in the event of a short-circuit fault of DC circuit 14, for example, short-circuit current flows through diodes 23C, 23B into capacitor 24. At the time when the voltage of DC circuit 14 becomes equal to the sum of respective voltages of capacitors 24 of leg circuit 4, the fault current stops flowing.

Voltage detection device 27 and transmission and reception device 28 in FIG. 3 are similar in configuration to those in FIG. 2, and the description thereof is therefore not repeated.

Figure 4:
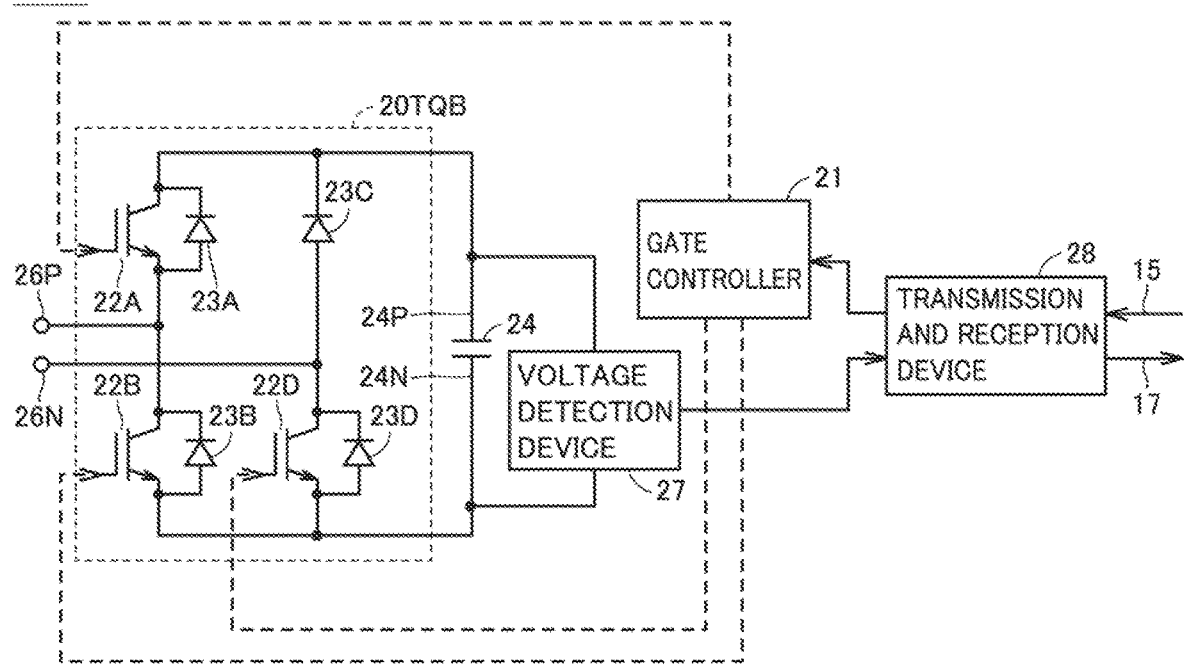
FIG. 4 is a circuit diagram showing still another example of a converter cell which is a component of each leg circuit in FIG. 1.

FIG. 4 is a circuit diagram showing a further example of the converter cell which is a component of each leg circuit in FIG. 1. A converter cell 7TQB shown in FIG. 4 includes a three-quarter-bridge-type conversion circuit 20TQB, a DC capacitor 24 serving as an energy storage device, a gate controller 21, a voltage detection device 27, and a transmission and reception device 28.

The configuration of three-quarter-bridge-type conversion circuit 20TQB corresponds to full-bridge-type conversion circuit 20FB shown in FIG. 3 from which switching device 22C is removed. In other respects, the former conversion circuit is identical to the conversion circuit in FIG. 3.

Gate controller 21 operates in accordance with control-and-protection command 15 received from control-and-protection command generator 3 in FIG. 1. During a normal operation (i.e., zero voltage or positive voltage is output between input/output terminals 26P and 26N), gate controller 21 performs control to cause switching device 22D to be kept ON and switching devices 22A, 22B to become the ON state alternately. Conversion circuit 20TQB shown in FIG. 4 can also output a negative voltage by causing switching devices 22A, 22D to be OFF, causing switching device 22B to be ON, and allowing current to flow from input/output terminal 26N toward input/output terminal 26P.

In contrast, when control-and-protection command generator 3 in FIG. 1 detects that the arm current is overcurrent, gate controller 21 turns off all of switching devices 22A to 22C for the sake of circuit protection. In this case, in the event of a ground fault of DC circuit 14, for example, fault current flows through diodes 23C, 23B into capacitor 24. At the time when the voltage of DC circuit 14 becomes equal to the sum of respective voltages of capacitors 24 of leg circuit 4, the fault current stops flowing.

Voltage detection device 27 and transmission and reception device 28 in FIG. 4 are similar in configuration to those in FIG. 2, and the description thereof is therefore not repeated.

As each of switching devices 22A, 22B, 22C, 22D shown in FIGS. 2 to 4, a self-arc-extinguishing-type switching device is used, of which ON operation and OFF operation can both be controlled. For example, IGBT (Insulated Gate Bipolar Transistor) or GCT (Gate Commutated Turn-off thyristor), for example, is used as switching device 22A, 22B, 22C, 22D.

Embodiment 1 is described in connection with the case where only one of respective types of cell converters shown in FIGS. 2 to 4 is used. An example where a combination of multiple types of cell converters is used is described in connection with Embodiment 3 with reference to FIG. 14.

Example Configuration of Control-and-Protection Command Generator

Figure 5:
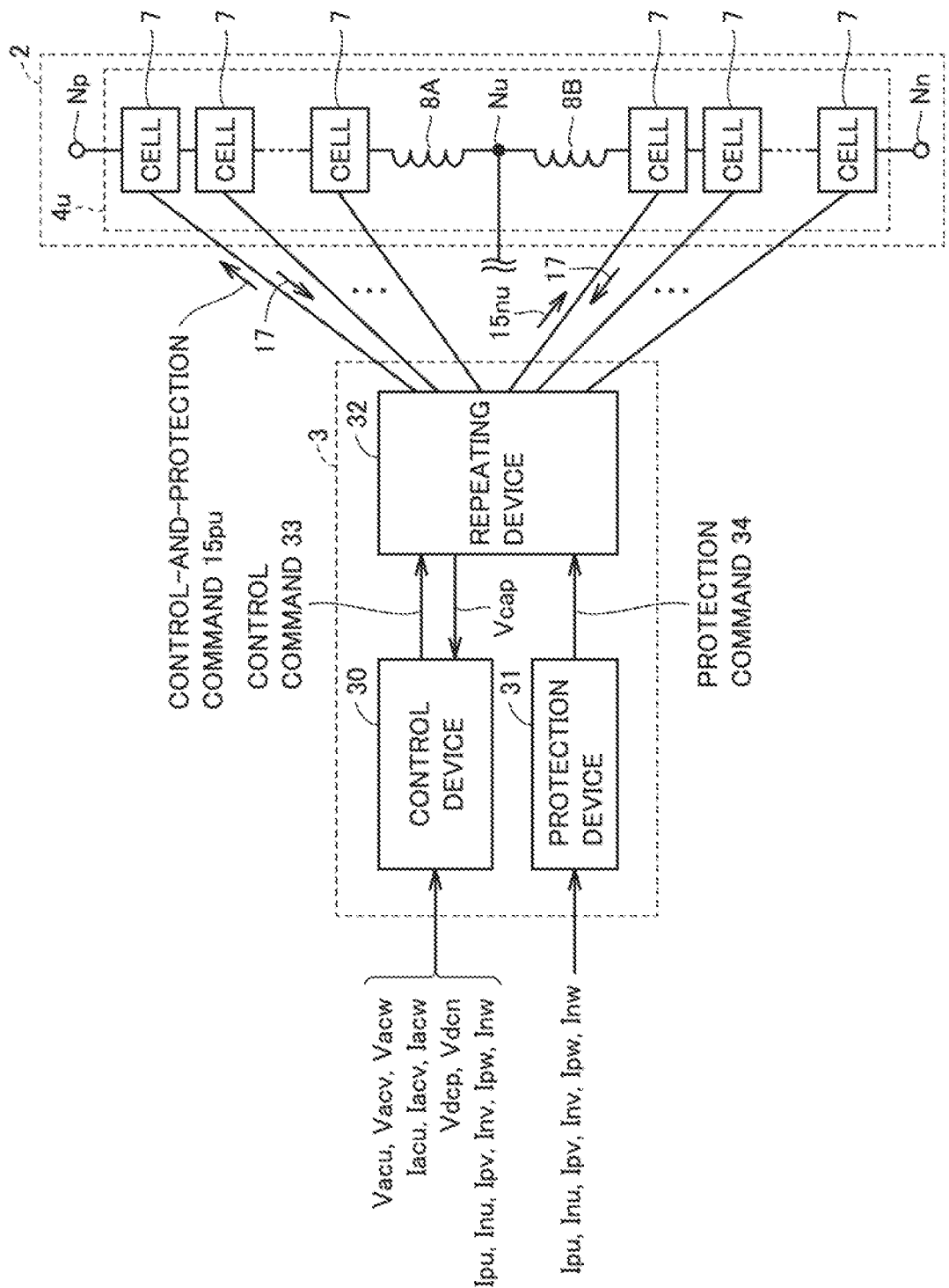
FIG. 5 is a block diagram showing a detailed configuration of a control-and-protection command generator in FIG. 1.

FIG. 5 is a block diagram showing a detailed configuration of the control-and-protection command generator in FIG. 1. Referring to FIG. 5, control-and-protection command generator 3 in FIG. 1 includes a control device 30, a protection device 31, and a repeating device 32. FIG. 5 shows only leg circuit 4u for U phase as a representative of the leg circuits of power conversion circuitry 2 in FIG. 1. The configuration in FIG. 5 applies as well to other leg circuits 4v, 4w.

Control device 30 generates a control command 33 for controlling operation of each converter cell 7 during a normal operation, based on cell capacitor voltage Vcap as well as AC voltages Vacu, Vacv, Vacw, AC currents Iacu, Iacy, Iacw, DC voltages Vdcp, Vdcn, and arm currents Ipu, Inu, Ipv, Inv, Ipw, Inw detected by the detection devices in FIG. 1. Cell capacitor voltage Vcap is determined by repeating device 32 for each arm circuit. Specifically, cell capacitor voltage Vcap is an average of respective voltage values of DC capacitors 24 detected in respective converter cells 7. Control command 33 is an output voltage command value for upper arm 5 and lower arm 6 of each of leg circuits 4u, 4v, 4w, for example. A more detailed example configuration of control device 30 is described in connection with FIG. 6.

Protection device 31 determines whether at least one of arm currents Ipu, Inu, Ipv, Inv, Ipw, Inw flowing in the upper arm or the lower arm of leg circuits 4u, 4v, 4w is higher than a threshold value or not, i.e., whether overcurrent flows or not. In accordance with the result of the determination, protection device 31 generates a protection command 34 for instructing whether to cause each converter cell 7 to operate (i.e., command to perform normal operation) based on control command 33, or to stop operation of each converter cell 7 (i.e., command to stop) regardless of control command 33. A further improved example configuration of protection device 31 is described in connection with Embodiment 2 with reference to FIGS. 10 to 13.

Repeating device 32 generates control-and-protection command 15 which is a combination of control information based on control command 33 and protection information based on protection command 34, and outputs the generated control-and-protection command 15 to each converter cell 7. In the case of the present embodiment, while the control information included in control-and-protection command 15 is specified for each of arms 5 and 6, the protection information is common to the arms in each converter cell 7. As described above in connection with FIGS. 2 to 4, converter cell 7 operates in accordance with control-and-protection command 15. A more detailed example configuration of repeating device 32 is described in connection with FIG. 7.

Calculation of the arm voltage command value by control device 30 takes some time. Therefore, where control device 30 transmits control command 33 for every period T1, protection device 31 transmits protection command 34 for every period T2 shorter than period T1. In order to convey the protection information to each converter cell 7 as quickly as possible, repeating device 32 transmits control-and-protection command 15 to each converter cell 7 for every period T3 shorter than period T1. Thus, the control information having the same contents included in control-and-protection command 15 is transmitted repeatedly until control command 33 is updated.

Control-and-protection command 15 may be transmitted through an optical fiber in order to increase the noise immunity. Control device 30, protection device 31, and repeating device 32 may be mounted on a common printed circuit board, or may be implemented as separate units. In the case where control device 30, protection device 31, and repeating device 32 are implemented as separate units, control command 33 and protection command 34 may be transmitted through an optical fiber. Control device 30, protection device 31, and repeating device 32 may be implemented by a dedicated circuit, or implemented partially or entirely by an FPGA (Field Programmable Gate Array) and/or a microprocessor.

Detailed Example Configuration of Control Device

Figure 6:
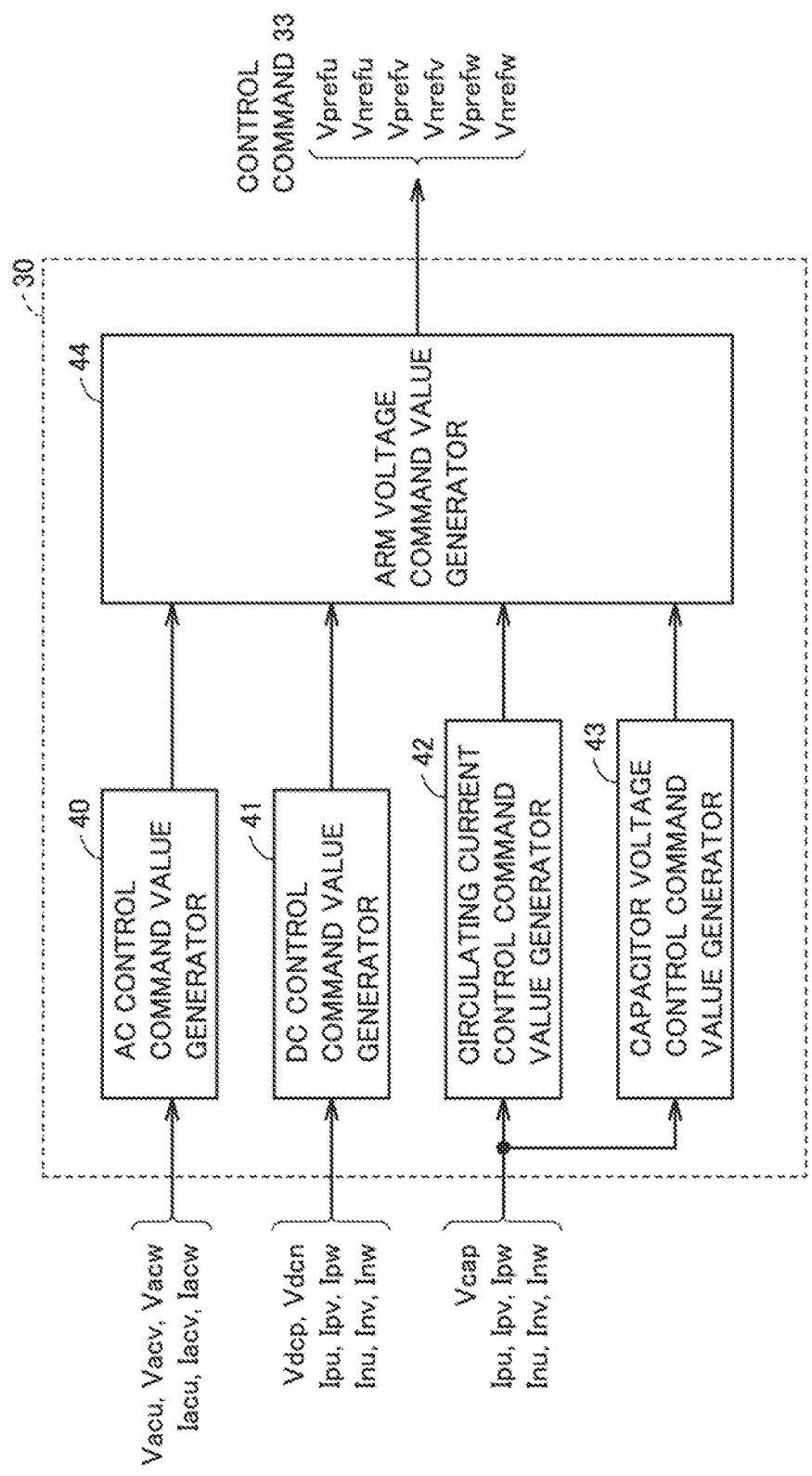
FIG. 6 is a block diagram showing an example configuration of a control device 30 in FIG. 5.

FIG. 6 is a block diagram showing an example configuration of control device 30 in FIG. 5. Referring to FIG. 6, control device 30 includes an AC control command value generator 40, a DC control command value generator 41, a circulating current command value generator 42, a capacitor voltage control command value generator 43, and an arm voltage command value generator 44.

Based on U phase, V phase, and W phase AC voltage values Vacu, Vacv, and Vacw (may be referred to collectively as AC voltage value Vac) detected by AC voltage detection device 10 and U phase, V phase, and W phase AC current values Iacu, Iacy, and Iacw (may be referred to collectively as AC current value Iac) detected by AC current detection device 16, AC control command value generator 40 generates AC voltage command values for respective phases. AC control command value generator 40 is implemented by a feedback controller such as PID controller (Proportional-Integral-Differential Controller), for example.

DC control command value generator 41 first calculates DC current value Idc based on arm currents Ipu, Inu, Ipv, Inv, Ipw, Inw of respective phases. Specifically, DC current Idc can be calculated by $$Idc=(Idc\_p+Idc\_n)/2 \qquad (1)$$

where Idc_p is the sum of upper arm currents Ipu, Ipv, Ipw, and Idc_n is the sum of lower arm currents Inu, Inv, Inw.

DC control command value generator 41 generates a DC voltage command value based on DC voltage values Vdcp, Vdcn detected by DC voltage detection devices 11A, 11B and the calculated DC current Idc. DC control command value generator 41 is implemented by a feedback controller such as PID controller, for example.

Circulating current control command value generator 42 first calculates circulating currents Iccu, Iccv, Iccw flowing respectively in leg circuits 4u, 4v, 4w, based on arm currents Ipu, Inu, Ipv, Inv, Ipw, Inw of respective phases. Circulating current is current circulating through a plurality of leg circuits 4. For example, circulating current Iccu flowing in U phase leg circuit 4u is represented by $$Iccu=(Ipu+Inu)/2-Idc/3 \qquad (2)$$

where the first term of above formula (2) represents current flowing commonly in upper arm 5 and lower arm 6 of leg circuit 4u, and the second term of above formula (2) represents a share of DC current Idc flowing in U phase leg circuit 4u, supposing that DC current Idc flows evenly in these leg circuits. DC circulating currents Iccv, Iccw can be calculated similarly.

Circulating current control command value generator 42 generates a command value for the circulating current of each phase, based on the calculated circulating current Iccu, Iccv, Iccw of each phase and cell capacitor current Vcap which is an average for each arm circuit. Circulating current control command value generator 42 is implemented by a feedback controller such as PID controller, for example.

Capacitor voltage control command value generator 43 generates a voltage command value for the DC capacitor of each converter cell 7, based on cell capacitor voltage Vcap which is an average for each arm circuit and based on arm currents Ipu, Inu, Ipv, Inv, Ipw, Inw of respective phases. Capacitor voltage control command value generator 43 is implemented by a feedback controller such as PID controller, for example.

Arm voltage command value generator 44 generates arm voltage command values Vprefu, Vnrefu, Vprefv, Vnrefv, Vprefw, Pnrefw for upper arms 5 and lower arms 6 of respective phases, by synthesizing respective command values of the above-described command value generators 40 to 43. Arm voltage command values Vprefu, Vnrefu, Vprefv, Vnrefv, Vprefw, Pnrefw of respective phases are transmitted as control commands 33 to repeating device 32. In the following, the command values may be referred to simply as arm voltage command values Vpref, Vnref, where the phases are not distinguished from each other.

The above-described configuration of control device 30 is given as an example, and a control device configured in a different manner may be applied to the present embodiment.

[Detailed Configuration and Operation of Repeating Device]

Figure 7:
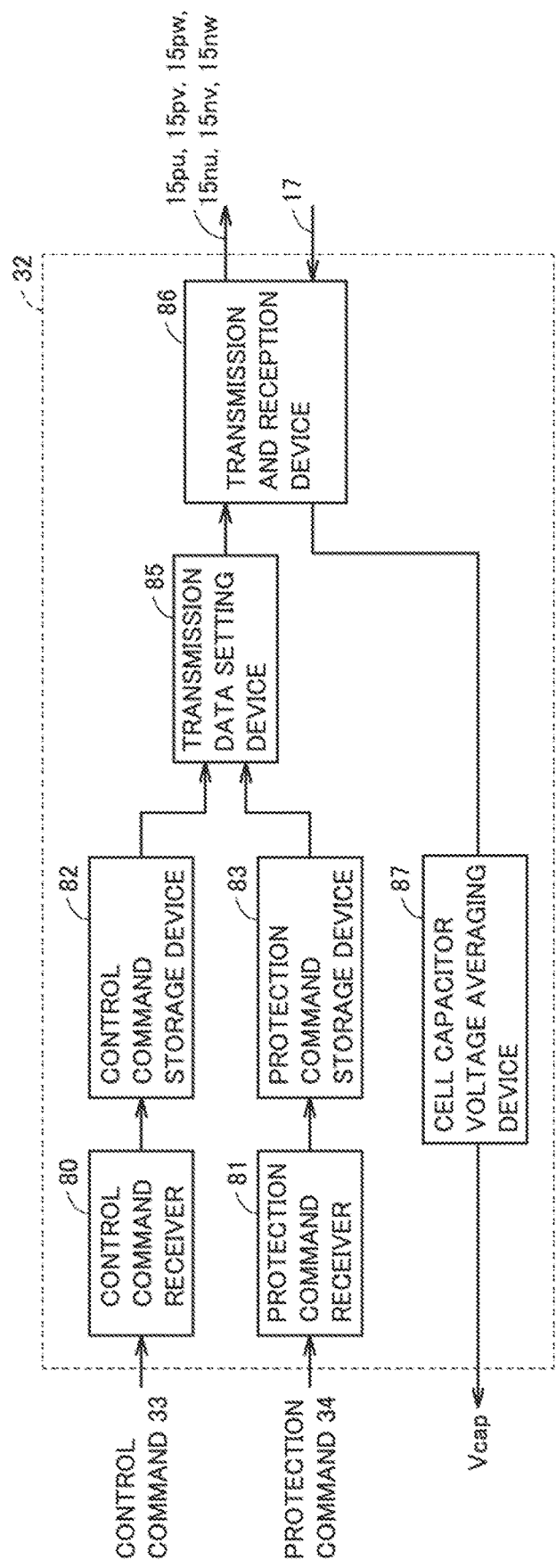
FIG. 7 is a block diagram showing an example configuration of a repeating device in FIG. 5.

FIG. 7 is a block diagram showing an example configuration of the repeating device in FIG. 5. Referring to FIG. 7, repeating device 32 includes a control command receiver 80, a protection command receiver 81, a control command storage device 82, a protection command storage device 83, a transmission data setting device 85, a transmission and reception device 86, and a cell capacitor voltage averaging device 87.

Control command receiver 80 receives arm voltage command values Vpref, Vnref transmitted as control command 33 from control device 30. The received control command 33 is stored in a memory as control command storage device 82. Data stored in control command storage device 82 is updated each time latest control command 33 is received.

Protection command receiver 81 receives protection command 34 transmitted from protection device 31. The received protection command 34 is stored in a memory as protection command storage device 83. Data stored in protection command storage device 83 is updated each time latest protection command 34 is received.

Transmission data setting device 85 sets data to be transmitted to each converter cell 7 (i.e., control-and-protection command 15) for each of arm circuits 5, 6, by combining latest control command 33 stored in control command storage device 82 and latest protection command 34 stored in protection command storage device 83. In FIG. 7, control-and-protection commands 15pu, 15pv, 15pw, 15nu, 15nv, and 15nw correspond respectively to the U phase upper arm, the V phase upper arm, the W phase upper arm, the U phase lower arm, the V phase lower arm, and the W phase lower arm. Transmission and reception device 86 transmits the generated control-and-protection command 15 to each converter cell 7 of the corresponding arm circuit.

In the case of the present embodiment, control-and-protection command 15 is generated by simply combining latest control command 33 and latest protection command 34. It is therefore unnecessary for repeating device 32 to perform further processing. Accordingly, transmission of control command 33 and protection command 34 to each converter cell 7 can be made faster.

For each arm circuit, cell capacitor voltage averaging device 87 calculates cell capacitor voltage Vcap by averaging respective voltages of DC capacitors 24 detected by respective voltage detection devices 27 of converter cells 7. The calculated cell capacitor voltage Vcap is used by control device 30 for generating control command 33.

Figure 8:
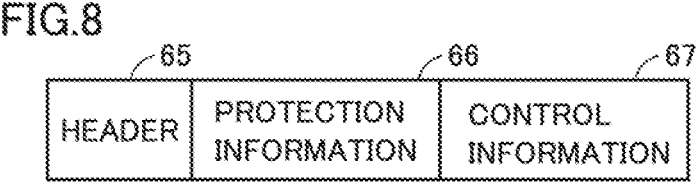
FIG. 8 schematically shows a frame structure of a control-and-protection command.

FIG. 8 schematically shows a frame structure of the control-and-protection command. In the case of FIG. 8, it is assumed that control-and-protection command 15 is transmitted by means of communication through an optical fiber or the like. As shown in FIG. 8, the frame of control-and-protection command 15 includes a header region 65, a data region 66 for protection information, and a data region 67 for control information.

The protection information in FIG. 8 is information based on latest protection command 34 stored in protection command storage device 83, and includes information about whether overcurrent is detected by any of arm current detection devices 9A, 9B described above in connection with FIG. 1, for example. The protection information may further include error detection information. The error detection information may be a redundant version of the protection information, or a known error detection code. The protection information is common to the arm circuits.

The control information in FIG. 8 is a set value of a gate drive signal based on latest control command 33 stored in control command storage device 82. In the case of the present embodiment, the control information is arm voltage command values Vprefu, Vnrefu, Vprefv, Vnrefv, Vprefw, Pnrefw set to different values for respective arms.

As shown in FIG. 8, it is desirable that the protection information is located closer to the head of the signal frame than the control information is. Accordingly, each converter cell 7 can perform signal processing based on the protection information, before performing signal processing based on the control information. Thus, when overcurrent is detected, operation of each converter cell 7 can be stopped more quickly.

Figure 9:
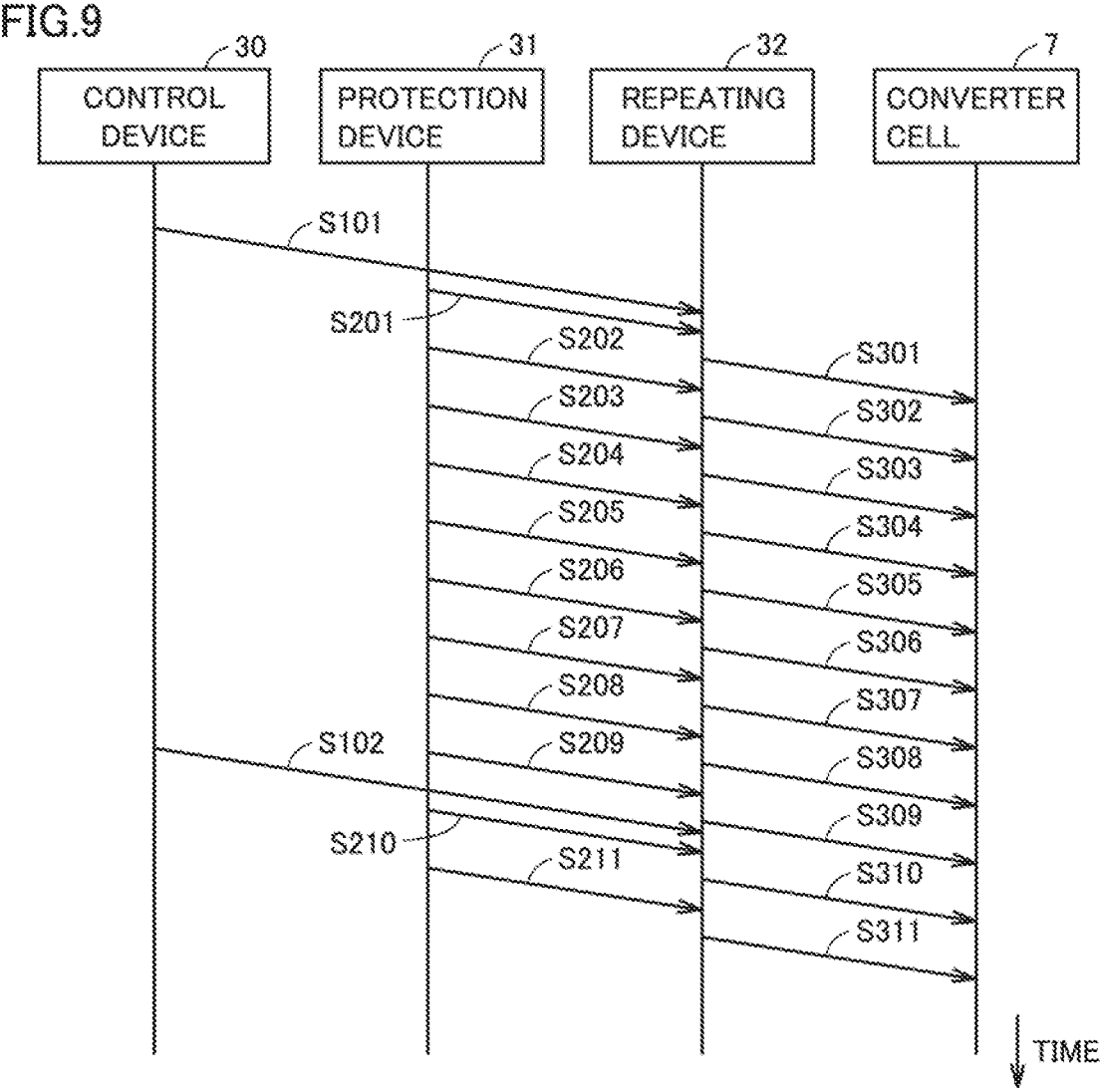
FIG. 9 is a sequence diagram for the control device, a protection device, and the repeating device described in connection with FIGS. 5 to 8.

FIG. 9 is a sequence diagram for the control device, the protection device, and the repeating device described above in connection with FIGS. 5 to 8.

Referring to FIGS. 5 to 9, control device 30 transmits control commands S101, S102, . . . for every first period T1. Protection device 31 transmits protection commands S201, S202, . . . for every second period T2 shorter than first period T1. Repeating device 32 transmits control-and-protection commands S301, S302, . . . for every third period T3 shorter than first period T1.

In FIG. 9, control-and-protection commands S301 to S311 are each generated by combining control information based on the latest control command and protection information based on the latest protection command into one frame. Specifically, respective pieces of protection information included in control-and-protection commands S301 to S311 are based on protection commands S201 to S211, respectively. In contrast, respective pieces of control information included in control-and-protection commands S301 to S309 are based on the same control command S101, and respective pieces of control information included in control-and-protection commands S310 and S311 are based on the same control command S102.

Advantageous Effects

In the following, advantageous effects of power conversion device 1 in Embodiment 1 are summarized.

The power conversion device in the present embodiment is characterized by the fact that the frame structure itself of each frame of control-and-protection command 15 remains the same, while the contents of the protection information as a component of the frame changes depending on whether during normal operation or in the event of detection of overcurrent. Therefore, in the event of detection of overcurrent, repeating device 32 operates in accordance with a sequence similar to that during normal operation, rather than performing special processing. Accordingly, signal processing by repeating device 32 is relatively simpler and faster signal processing can thus be achieved.

For each converter cell 7 receiving control-and-protection command 15, the frame structure itself of control-and-protection command 15 also remains the same regardless of whether during normal operation or in the event of detection of overcurrent. Signal processing in each converter cell 7 is relatively simpler and faster signal processing can be achieved. Moreover, unlike above-referenced PTD 1 (Japanese Patent Laying-Open No. 2014-207728), the signal frame structure is not switched, and therefore, processing for preventing malfunction can also be simplified.

As seen from the foregoing, power conversion device 1 in the present embodiment can transmit, as quickly as possible, the stop command to each converter cell upon detecting overcurrent. Further, the present embodiment has an advantage that, when a fault in an electric power system is eliminated, the power conversion device can be recovered from fault by only changing the contents of the control information included in the control-and-protection command.

Embodiment 2

In connection with Embodiment 2, a specific example of a circuit for speeding up detection of overcurrent by protection device 31 in FIG. 5 is described.

Figure 10:
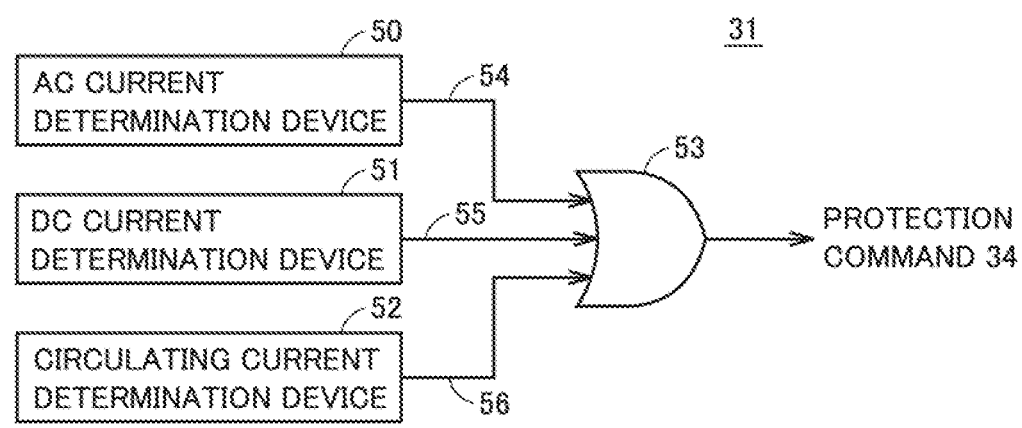
FIG. 10 is a block diagram showing an example of a configuration of a protection device 31 in FIG. 5.

FIG. 10 is a block diagram showing an example of a configuration of protection device 31 in FIG. 5. Referring to FIG. 10, protection device 31 includes an AC current determination device 50, a DC current determination device 51, a circulating current determination device 52, and a logical sum calculation device 53.

In order to determine as quickly as possible whether a fault has occurred to AC circuit 12 in FIG. 1, AC current determination device 50 determines whether a first determination condition is satisfied or not, where the first determination condition is a condition that at least one of respective absolute values of upper arm currents Ipu, Ipv, Ipw and respective absolute values of lower arm currents Inu, Inv, Inw is larger than threshold value TH1.

In order to determine as quickly as possible whether a fault has occurred to DC circuit 14 in FIG. 1, DC current determination device 51 determines whether a second determination condition is satisfied or not, where the second determination condition is a condition that an absolute value of DC current Idc is larger than threshold value TH2. Specifically, DC current Idc may be calculated in accordance with the aforementioned formula (1), or the sum Idc_p of upper arm currents Ipu, Ipv, Ipw may be used as the DC current, or the sum Idc_n of lower arm currents Inu, Inv, Inw may be used as the DC current, or both Idc_p and Idc_n may be used.

In order to determine whether a fault has occurred to power conversion circuitry 2 in FIG. 1, circulating current determination device 52 determines whether a third determination condition is satisfied or not, where the third determination condition is a condition that an absolute value of circulating current flowing in at least one leg circuit is larger than threshold value TH3.

Specifically, U phase circulating current Iccu may be calculated in accordance with the aforementioned formula (2). In formula (2), DC current Idc may be calculated in accordance with formula (1), or the sum Idc_p of upper arm currents Ipu, Ipv, Ipw may be used as the DC current, or the sum Idc_n of lower arm currents Inu, Inv, Inw may be used as the DC current. V phase and W phase circulating currents Iccv and Iccw can also be calculated similarly.

Logical sum calculation device 53 calculates the logical sum of a determination result 54 obtained by AC current determination device 50, a determination result 55 obtained by DC current determination device 51, and a determination result 56 of circulating current determination device 52, and outputs the result of the calculation as protection command 34. Therefore, when at least one of AC current determination device 50, DC current determination device 51, and circulating current determination device 52 detects overcurrent, a stop command to stop the operation of each converter cell 7, which is a component of power conversion circuitry 2, is output, as protection command 34, from logical sum calculation device 53.

Figure 11:
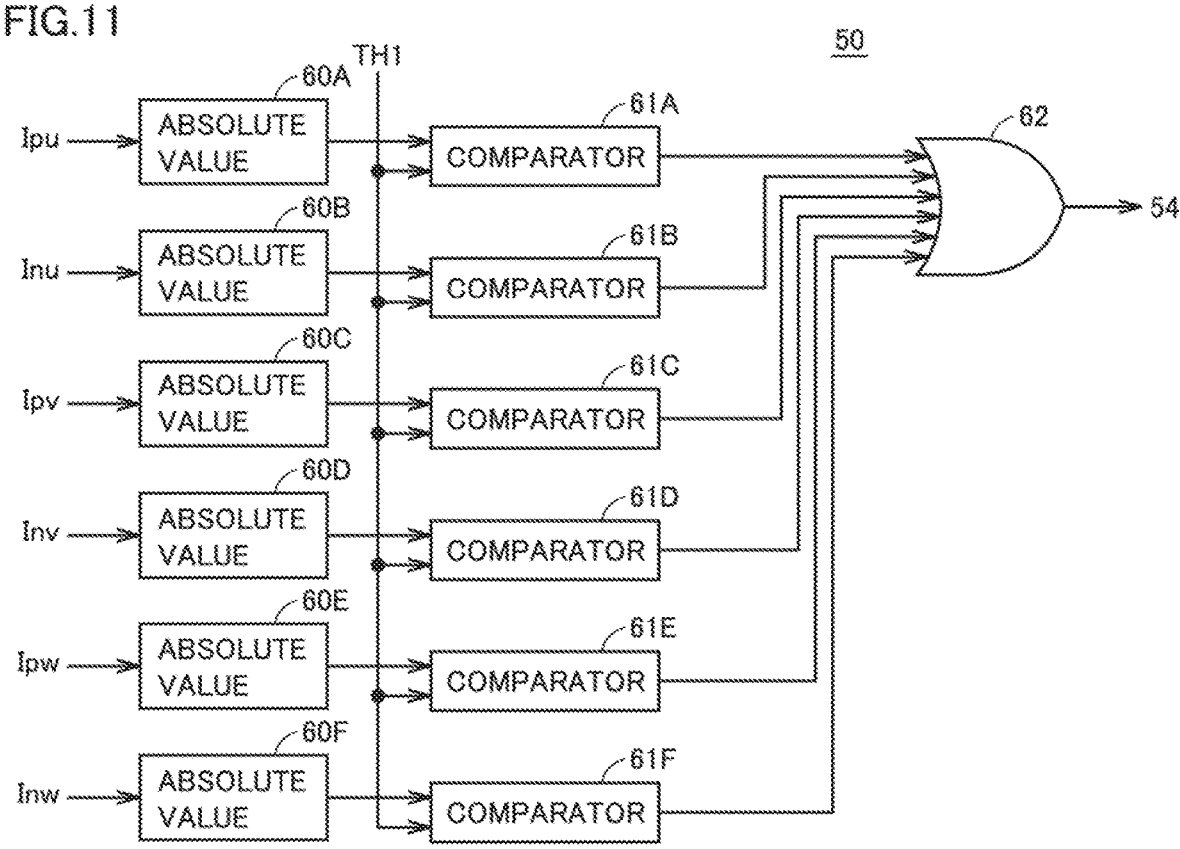
FIG. 11 is a block diagram showing an example of a configuration of an AC current determination device 50 in FIG. 10.

FIG. 11 is a block diagram showing an example of a configuration of AC current determination device 50 in FIG. 10. Referring to FIG. 11, AC current determination device 50 includes absolute value calculation devices 60A to 60F, comparators 61A to 61F (may be referred to collectively or non-specifically as comparator 61), and a logical sum calculation device 62.

Absolute value calculation devices 60A to 60F calculate the absolute values of arm current values Ipu, Inu, Ipv, Inv, Ipw, Inw respectively detected by current detection device 9A or 9B for each leg circuit 4.

Comparators 61A to 61F compare the absolute values of arm current values Ipu, Inu, Ipv, Inv, Ipw, Inw respectively with threshold value TH1. Each comparator 61 outputs logical value "1" when the absolute value of the associated arm current value is larger than threshold value TH1.

Logical sum calculation device 62 outputs the logical sum of the comparison results obtained by comparators 61A to 61F, as determination result 54 obtained by AC current determination device 50. When at least one of the absolute values of arm current values Ipu, Inu, Ipv, Inv, Ipw, Inw is larger than threshold value TH1, AC current determination device 50 determines that this is overcurrent.

Figure 12:
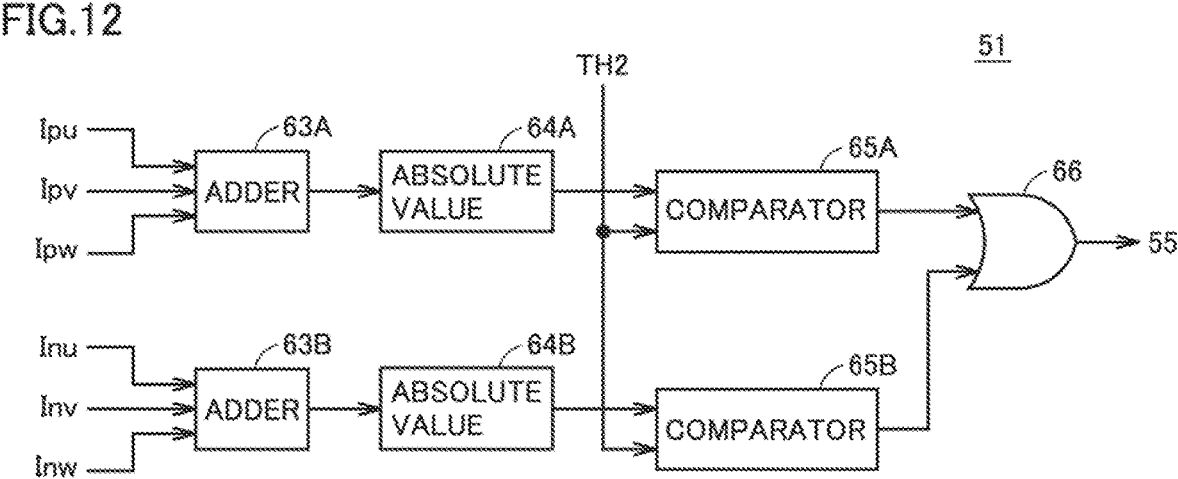
FIG. 12 is a block diagram showing an example of a configuration of a DC current determination device 51 in FIG. 10.

FIG. 12 is a block diagram showing an example of a configuration of DC current determination device 51 in FIG. 10. Referring to FIG. 12, DC current determination device 51 includes adders 63A, 63B, absolute value calculation devices 64A, 64B, comparators 65A, 65B, and a logical sum calculation device 66.

Adder 63A adds together upper arm current values Ipu, Ipv, Ipw, and absolute value calculation device 64A calculates the absolute value of the result of this addition. Thus, the absolute value of DC current Idc_p based on the upper arm currents is determined.

Likewise, adder 63B adds together lower arm current values Inu, Inv, Inw, and absolute value calculation device 64B calculates the absolute value of the result of this addition. Thus, the absolute value of DC current Idc_n based on the lower arm currents is determined.

Comparators 65A, 65B compare respective calculated absolute values of DC currents Idc_p, Idc_n with threshold value TH2. Each of comparators 65A, 65B outputs logical value "1" when the absolute value of the associated arm current value is larger than threshold value TH2.

Logical sum calculation device 66 outputs the logical sum of the comparison results obtained by comparators 65A, 65B, as determination result 55 obtained by DC current determination device 51. Therefore, when at least one of respective absolute values of DC currents Idc_p, Idc_n is larger than threshold value TH2, DC current determination device 51 determines that this is overcurrent.

Figure 13:
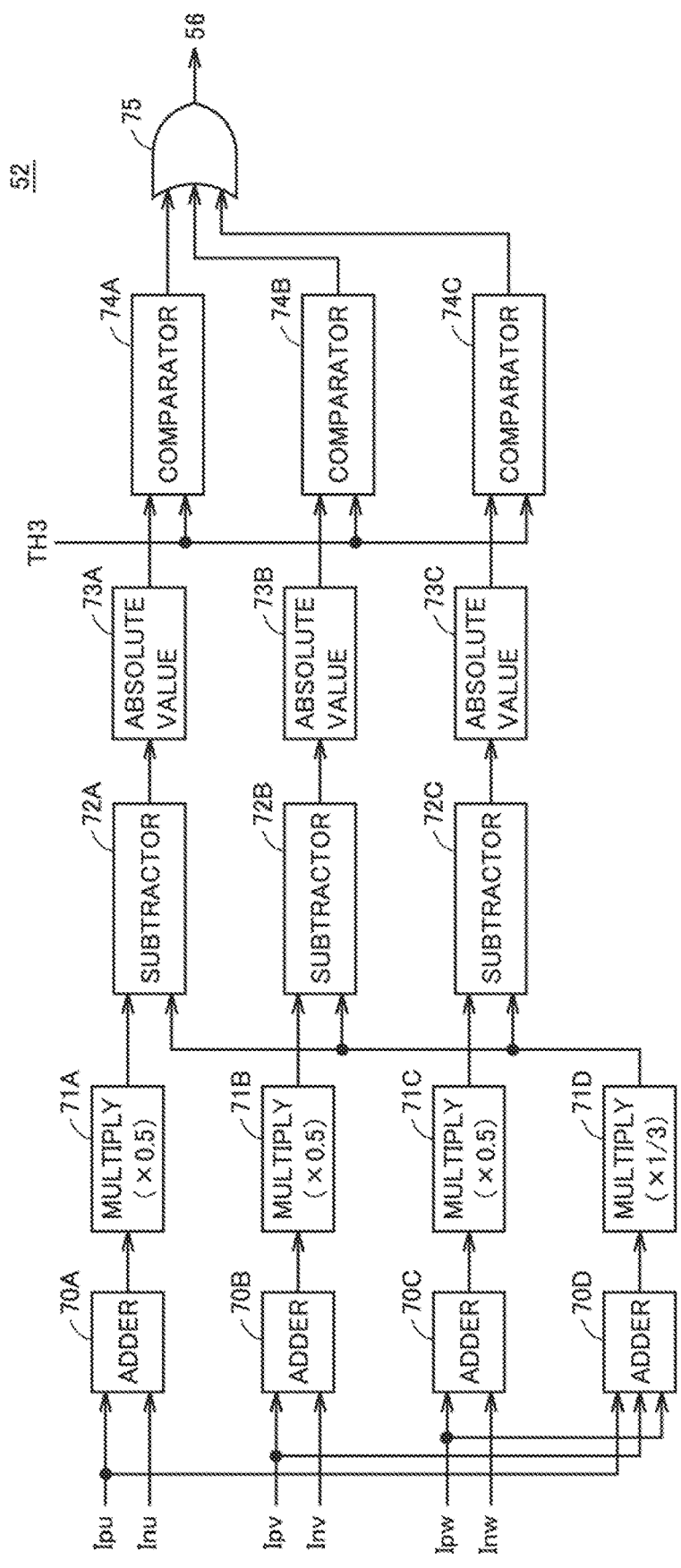
FIG. 13 is a block diagram showing an example of a configuration of a circulating current determination device 52 in FIG. 10.

FIG. 13 is a block diagram showing an example of a configuration of circulating current determination device 52 in FIG. 10. Referring to FIG. 13, circulating current determination device 52 includes adders 70A to 70D, a constant multipliers 71A to 71C for multiplying constant 0.5, a constant multiplier 71D for multiplying constant ⅓, subtractors 72A, 72B, 72C, absolute value calculation devices 73A to 73C, comparators 74A to 74C, and a logical sum calculation device 75.

Adder 70A and constant multiplier 71A determine the average of U phase upper arm current Ipu and lower arm current Inu to thereby calculate common leg current Icomu flowing in both U phase upper arm and lower arm. Likewise, adder 70B and constant multiplier 71B calculate common leg current Icomv flowing in both V phase upper arm and lower arm, and adder 70C and constant multiplier 71C calculate common leg current Icomw flowing in both W phase upper arm and lower arm.

Adder 70D and constant multiplier 71D calculate one third of DC current Idc_p based on the upper arm currents, i.e., calculate the DC current value as a share of each leg circuit 4. Subtractors 72A, 72B, 72C subtract this DC current value from leg current values Icomu, Icomv, Icomw, absolute value calculation devices 73A to 73C calculate respective absolute values of the results of the subtraction. Accordingly, the absolute values of circulating currents Iccu, Iccv, Iccw flowing in respective leg circuits 4 are determined.

Comparators 74A to 74C compare the calculated respective absolute values of circulating currents Iccu, Iccv, Iccw flowing in leg circuits 4 with threshold value TH3. Each of comparators 74A to 74C outputs logical value "1" when the absolute value of the associated circulating current is larger than threshold value TH3.

Logical sum calculation device 75 outputs the logical sum of respective results of comparison made by comparators 74A to 74C, as determination result 56 obtained by circulating current determination device 52. Therefore, when at least one of respective absolute values of circulating currents Iccu, Iccv, Iccw is larger than threshold value TH3, circulating current determination device 52 determines that this is overcurrent.

As seen from the foregoing, in the power conversion device in Embodiment 2, the protection device is configured to detect overcurrent by not only comparing the absolute value of each arm current with threshold value TH1, but also comparing the calculated DC current and the calculated circulating current with threshold values TH2 and TH3, respectively. Accordingly, when a fault occurs to any of AC circuit 12, DC circuit 14, and power conversion circuitry 2, overcurrent due to occurrence of the fault can be detected as quickly as possible.

Circulating current determination device 52 in FIG. 10 may not be included. In this case, it is possible to provide a protection device capable of detecting overcurrent as quickly as possible when a fault occurs to one of AC circuit 12 and DC circuit 14.

Embodiment 3

In a power protection device in Embodiment 3 described below, at least one leg circuit 4 includes converter cells 7 of different types. In the following, an example is given in which U phase leg circuit 4u includes half-bridge-type converter cell 7HB and full-bridge-type converter cell 7FB.

This example is applicable as well to V phase leg circuit 4v and W phase leg circuit 4w. The same is also applicable to a leg circuit including converter cells 7 of different circuit types, and applicable to a leg circuit including three or more types of converter cells 7.

Figure 14:
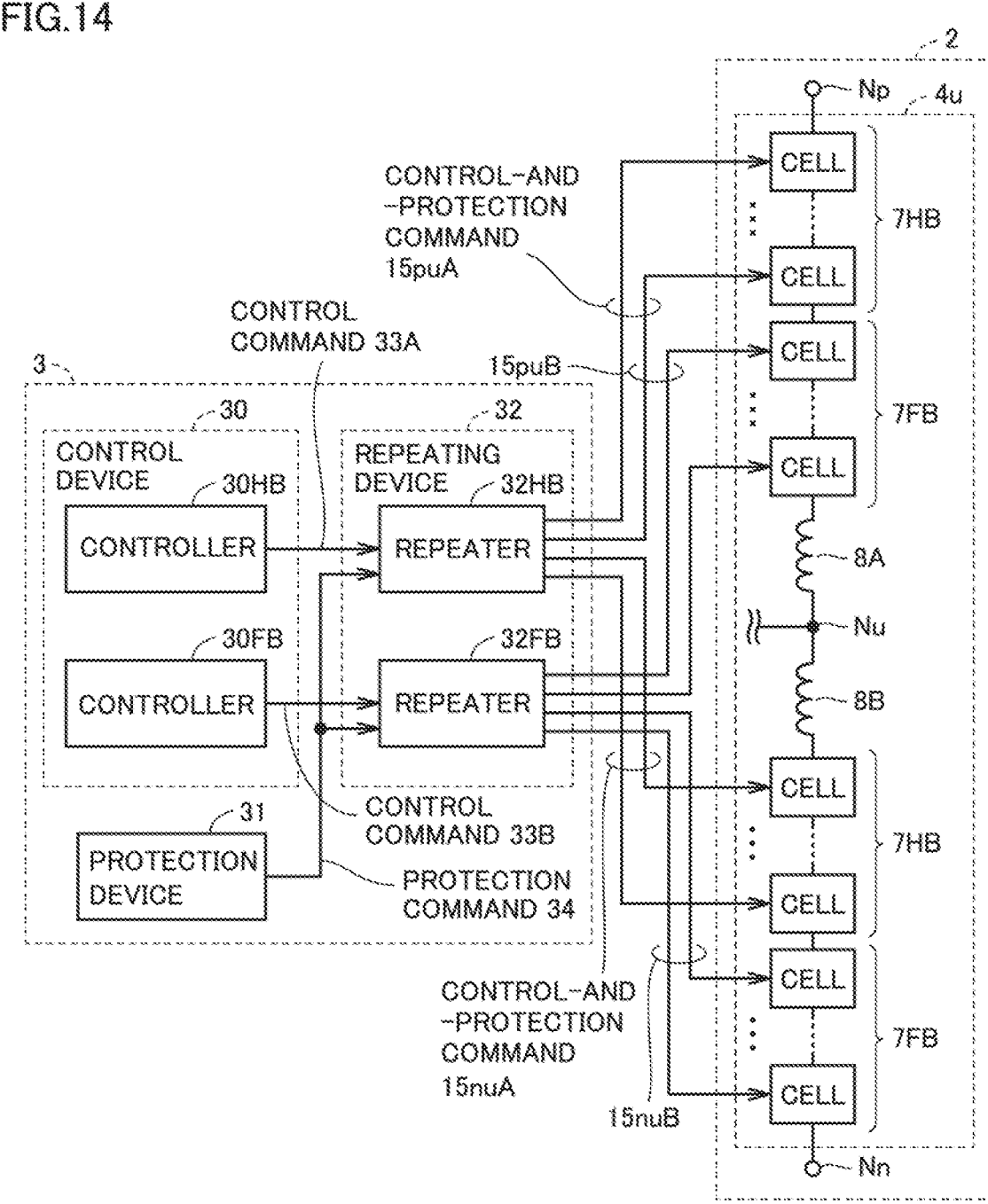
FIG. 14 is a block diagram showing a schematic configuration of a power protection device in Embodiment 3.

FIG. 14 is a block diagram showing a schematic configuration of a power protection device in Embodiment 3. Referring to FIG. 14, a U phase leg circuit 4u of power conversion circuitry 2 includes a plurality of half-bridge-type converter cells 7HB and a plurality of full-bridge-type converter cells 7FB.

As shown in FIG. 14, a repeating device 32 includes a first repeater 32HB configured to output control-and-protection commands 15puA, 15nuA to half-bridge-type converter cells 7HB, and a second repeater 32FB configured to output control-and-protection commands 15puB, 15nuB to full-bridge-type converter cells 7FB.

Control device 30 includes a first controller 30HB configured to output control command 33A to repeater 32HB for controlling operation of each converter cell 7HB, and a second controller 30FB configured to output control command 33B to repeater 32FB for controlling operation of each converter cell 7FB. Thus, different control commands 33A, 33B are transmitted for different types of converter cells 7HB, 7FB.

In contrast, protection device 31 is configured to output common protection command 34 to first repeater 32HB and second repeater 32FB. Thus, since protection device 31 is provided independently of control device 30, it is unnecessary to change protection command 34 depending on the type of converter cell 7HB, 7FB. Therefore, when overcurrent is detected, the command to stop operation can be transmitted quickly to each converter cell regardless of the type of converter cell 7HB, 7FB.

Other respects in FIG. 14 are similar to those in Embodiment 1, and therefore, the detailed description thereof is not repeated. The configuration of protection device 31 described above in connection with Embodiment 2 is also applicable to Embodiment 3.

Embodiment 4

In connection with Embodiment 4, an example is described in which open/close of circuit breakers is controlled based on the results of determinations made by AC current determination device 50 and DC current determination device 51 of protection device 31 in FIG. 10.

Figure 15:
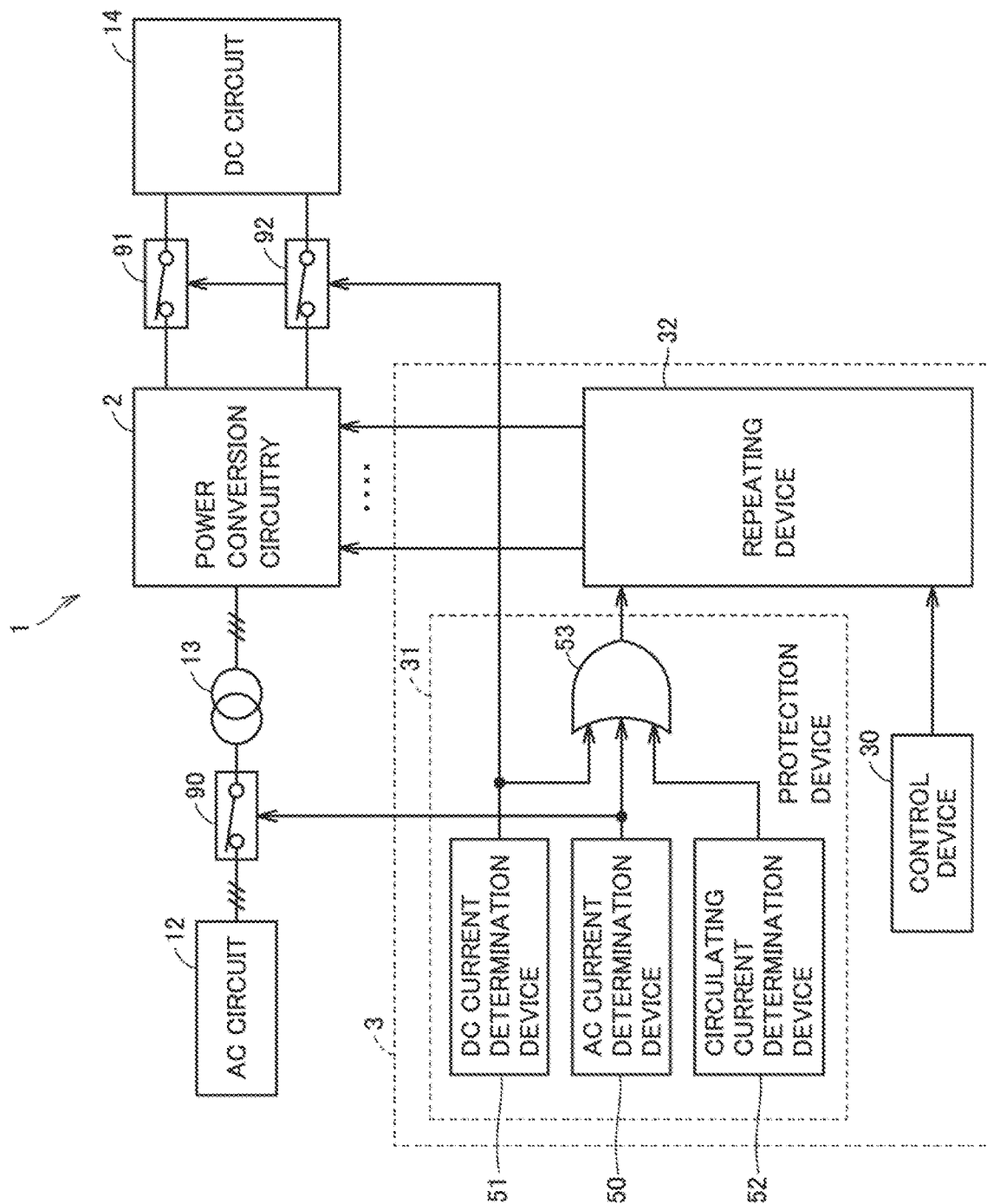
FIG. 15 is a block diagram showing a configuration of a power conversion device in Embodiment 4.

FIG. 15 is a block diagram showing a configuration of a power conversion device in Embodiment 4. In power conversion device 1 in FIG. 15, protection device 31 has a configuration described above with reference to FIG. 10 in Embodiment 2.

In power conversion device 1 in FIG. 15, an AC circuit breaker 90 is disposed between power conversion circuitry 2 and AC circuit 12, and DC circuit breakers 91, 92 are disposed between power conversion circuitry 2 and DC circuit 14. For the sake of simplifying the drawing, FIG. 15 shows only one AC circuit breaker 90. Actually, however, three AC circuit breakers in total are arranged for respective phases of three-phase transmission lines.

When AC current determination device 50 detects overcurrent, protection device 31 outputs a trip signal for opening AC circuit breaker 90. When DC current determination device 51 detects overcurrent, protection device 31 outputs a trip signal for opening DC circuit breakers 91, 92.

Thus, upon occurrence of a short circuit fault or ground fault in AC circuit 12, AC circuit 12 and power conversion circuitry 2 can be disconnected from each other as quickly as possible to thereby protect power conversion circuitry 2. Upon occurrence of a short circuit fault or ground fault in DC circuit 14, DC circuit 14 and power conversion circuitry 2 can be disconnected from each other as quickly as possible to thereby protect power conversion circuitry 2.

Other respects in FIG. 15 are those described above in connection with Embodiment 1 and Embodiment 2, and therefore, the detailed description is not repeated. The above-described configuration of protection device 31 in Embodiment 4 may be combined with the configuration of control device 30 and repeating device 32 in Embodiment 3.

Embodiment 5

A power conversion device in Embodiment 5 relates to a case where each converter cell 7 included in power conversion circuitry 2 is a full-bridge-type converter cell 7FB in FIG. 3. In this case, the power conversion device in Embodiment 5 is configured to output a reverse voltage from each converter cell 7FB based on determination result 55 obtained by DC current determination device 51 in FIG. 10. The power conversion device in the present embodiment is therefore based on the configuration of protection device 31 in Embodiment 2.

As described above in connection with FIG. 3, if all of switching devices 22A to 22D are turned off upon occurrence of a short-circuit fault in DC circuit 14, the voltage of capacitor 24 is output through diodes 23C, 23B. In this case, switching devices 22B, 22C can be caused to become the ON state and switching devices 22A, 22B can be caused to become the OFF state to output a reverse voltage without passing through diodes 23B, 23C. Accordingly, the loss of diodes 23B, 23C can be reduced and breakage of diodes 23B, 23C can be prevented. In the following, an operation of gate controller 21 in each cell converter 7FB for performing such control is described.

Figure 16:
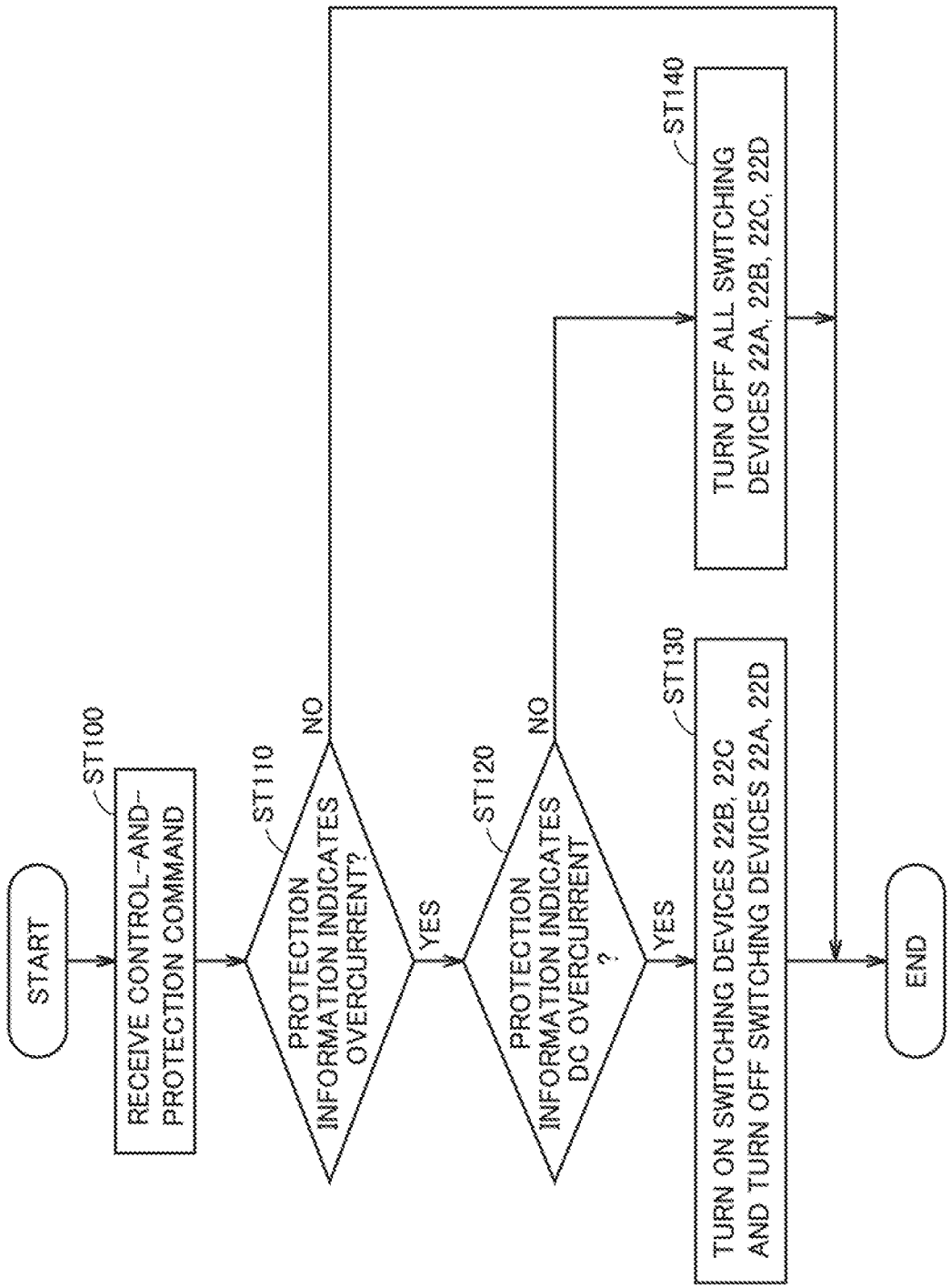
FIG. 16 is a flowchart illustrating an operation of a gate controller of each converter cell in a power conversion device in Embodiment 5.

FIG. 16 is a flowchart illustrating an operation of a gate controller of each converter cell in the power conversion device in Embodiment 5. In the case of Embodiment 5, protection command 34 which is output from protection device 31 includes information concerning the result of determination made by DC current determination device 51.

Referring to FIGS. 3 and 16, in step ST100, gate controller 21 of each converter cell 7FB receives control-and-protection command 15 from repeating device 32. Protection information included in control-and-protection command 15 includes information about whether any of AC current determination device 50, DC current determination device 51, and circulating current determination device 52 has detected overcurrent or not, and information about whether DC current determination device 51 has detected overcurrent or not.

In the next step ST110, gate controller 21 of each converter cell 7FB determines whether the protection information of received control-and-protection command 15 includes information indicating overcurrent or not. When the protection information indicates overcurrent (YES in step ST110), gate controller 21 determines, in the next step ST120, whether the protection information indicates overcurrent in DC circuit 12 or not. In other words, gate controller 21 determines whether DC current determination device 51 has detected overcurrent or not.

When it is the result of the above determination that the protection information indicates overcurrent in DC circuit 12 (YES in step ST120), gate controller 21 turns on switching devices 22B, 22C and turns off switching devices 22A, 22B to thereby output a reverse voltage without passing through diodes 23B, 23C (step ST130). In contrast, when the protection information indicates overcurrent but the protection information does not indicate overcurrent in DC circuit 12 (NO in step ST120), gate controller 21 turns off all of switching devices 22A to 22D (step ST140).

Other respects of the operation of the power conversion device in Embodiment 5 are similar to those in Embodiment 1 and Embodiment 2, and therefore, the description is not repeated. The present embodiment may be combined with any of Embodiment 3 and Embodiment 4.

Embodiment 6

In connection with Embodiment 6, a different configuration of control device 30 of the power conversion device in Embodiment 1 is described.

Figure 17:
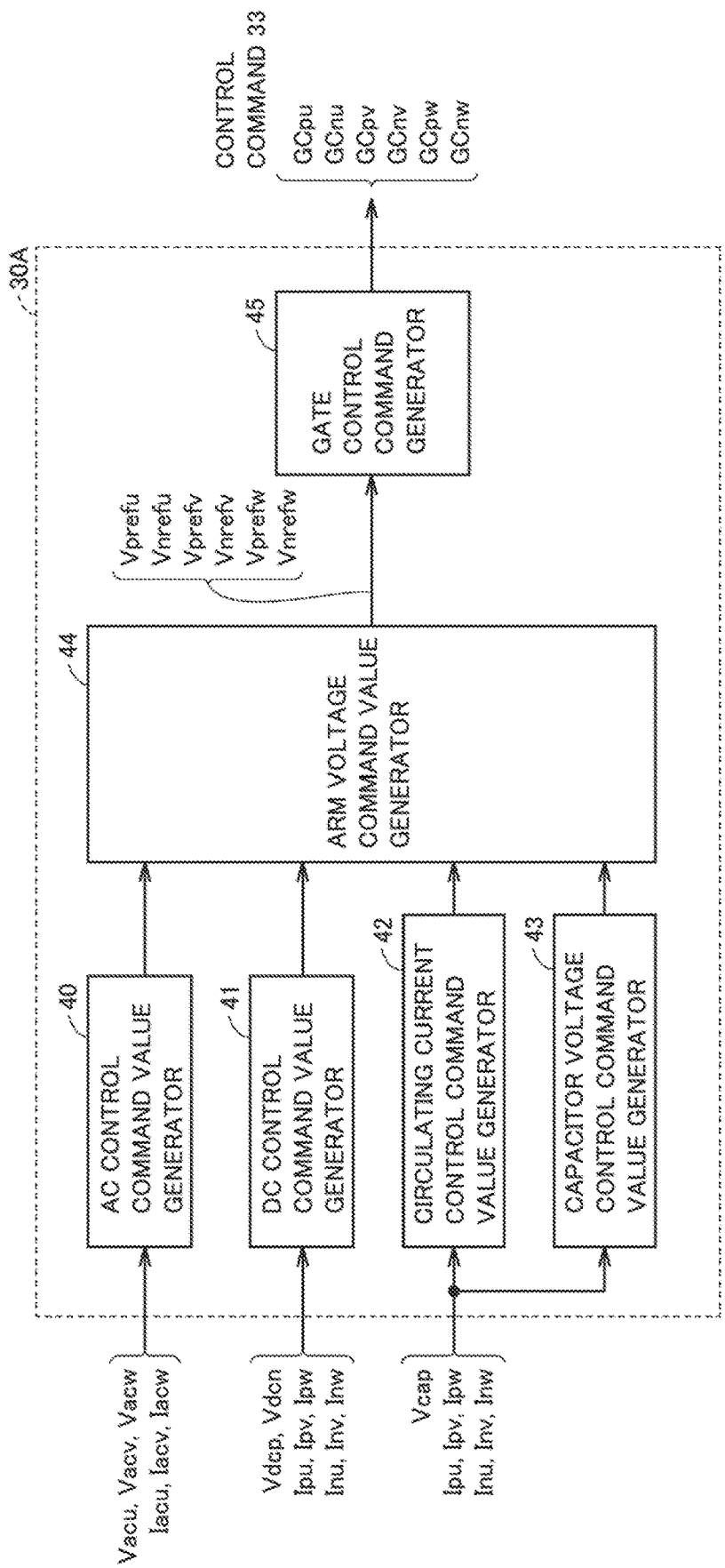
FIG. 17 is a block diagram showing an example configuration of a control device in a power conversion device in Embodiment 6.

FIG. 17 is a block diagram showing an example configuration of a control device of a power conversion device in Embodiment 6. Control device 30A in FIG. 17 differs from control device 30 in FIG. 6 in that the former further includes a gate control command generator 45 in the subsequent stage of arm voltage command value generator 44.

Referring to FIG. 17, gate control command generator 45 generates gate control command GCpu for controlling ON/OFF of switching device 22 (22A, 22B, 22C, 22D) in converter cell 7 which is a component of the U phase upper arm, based on U phase upper arm voltage command value Vprefu. Similarly, gate control command generator 45 generates gate control command GCpn for each converter cell 7 which is a component of the U phase lower arm, based on U phase lower arm voltage command value Vnrefu. Gate control command generator 45 generates gate control command GCpv for each converter cell 7 which is a component of the V phase upper arm, based on V phase upper arm voltage command value Vprefv, and generates gate control command GCnv for each converter cell 7 which is a component of the V phase lower arm, based on V phase lower arm voltage command value Vnrefv. Gate control command generator 45 generates gate control command GCpw for each converter cell 7 which is a component of the W phase upper arm, based on W phase upper arm voltage command value Vprefw, and generates gate control command GCnw for each converter cell 7 which is a component of the W phase lower arm, based on W phase lower arm voltage command value Vnrefw. The generated gate control commands GCpu, GCnu, GCpv, GCnv, GCpw, GCnw are transmitted as control command 33 to repeating device 32 in FIG. 5.

In the case of the present embodiment, repeating device 32 generates control-and-protection command 15 by combining gate control commands GCpu, GCnu, GCpv, GCnv, GCpw, GCnw provided as control command 33 with protection command 34. In this case, a more detailed configuration of repeating device 32 is similar to that described above in connection with FIG. 7. Specifically, transmission data setting device 85 simply combines latest control command 33 with latest protection command 34 to thereby generate control-and-protection command 15. It is therefore unnecessary for repeating device 32 to perform further signal processing, and accordingly control command 33 and protection command 34 can be transmitted to each converter cell 7 more quickly.

It should be noted that control command 33 is constituted of control commands GCpu, GCnu, GCpv, GCnv, GCpw, GCnw that are set for each converter cell 7, control-and-protection command 15 is also set for each converter cell 7.

Gate controller 21 of each converter cell 7 controls ON/OFF of each switching device 22 based on the associated gate control command during normal control.

In other respects, the power conversion device in Embodiment 6 is similar to the power conversion device in Embodiment 1, and therefore, the description thereof is not repeated. Embodiment 6 may be combined with any of Embodiments 2 to 5.

Embodiment 7

In connection with Embodiment 7, a different configuration of repeating device 32 of the power conversion device in Embodiment 1 is described.

Figure 18:
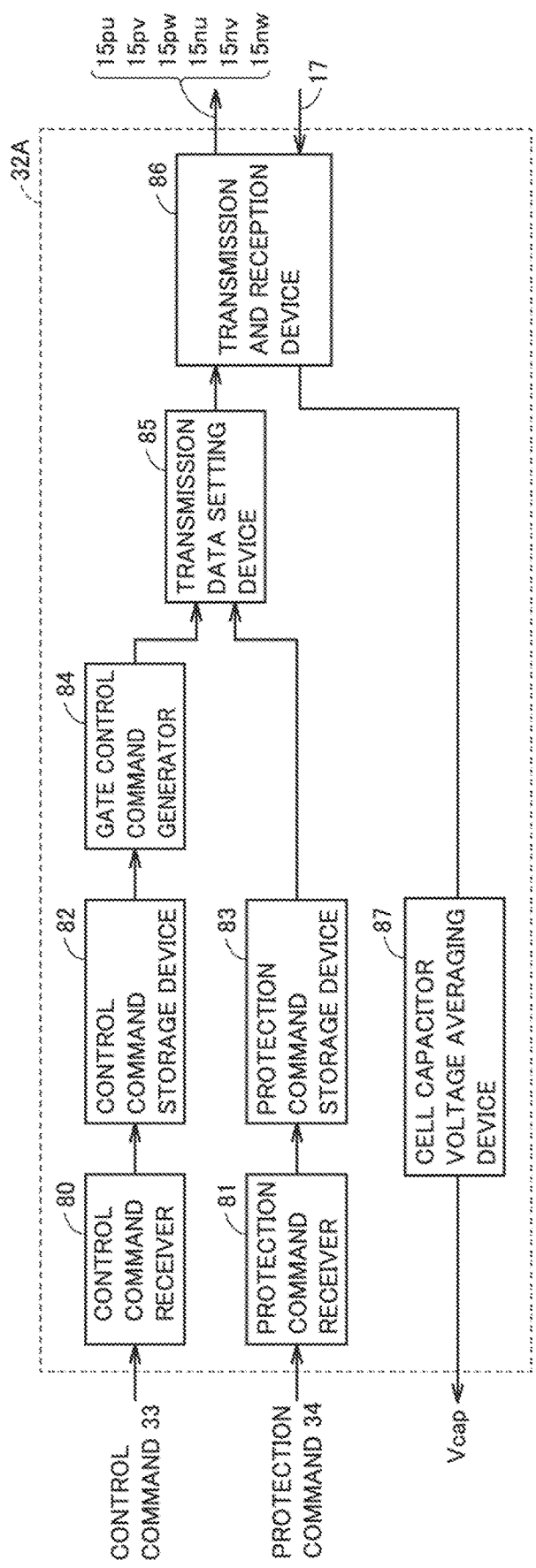
FIG. 18 is a block diagram showing an example configuration of a repeating device in a power conversion device in Embodiment 7.

FIG. 18 is a block diagram showing an example configuration of a repeating device of a power conversion device in Embodiment 7. Repeating device 32A in FIG. 18 differs from repeating device 32 in FIG. 7 in that the former further includes a gate control command generator 84 between control command storage device 82 and transmission data setting device 85.

Referring to FIG. 18, gate control command generator 84 sets a gate drive signal for each U phase converter cell 7, based on U phase voltage command values Vprefu, Vnrefu. Similarly, gate control command generator 84 sets a gate drive signal for each V phase converter cell 7, based on V phase voltage command values Vprefv, Vnrefv, and sets a gate drive signal for each W phase converter cell 7, based on W phase voltage command values Vprefw, Vnrefw.

Transmission data setting device 85 sets, for each converter cell 7, data (i.e., control-and-protection command 15) to be transmitted to each converter cell 7, by combining the set value of the gate drive signal for each converter cell 7 based on latest control command 33 stored in control command storage device 82, with latest protection command 34 stored in protection command storage device 83. Control-and-protection command 15 in this case varies depending on each converter cell.

In the case of Embodiment 7, conversion of control command 33 is necessary, and therefore, signal processing by repeating device 32A is more complicated as compared with Embodiment 1. However, signal processing by gate controller 21 for each converter cell 7 can be simplified as compared with Embodiment 1.

In other respects, the power conversion device in Embodiment 7 is similar to the power conversion device in Embodiment 1, and therefore, the description thereof is not repeated. Embodiment 7 may be combined with any of Embodiments 2 to 5.

Embodiment 8

Figure 19:
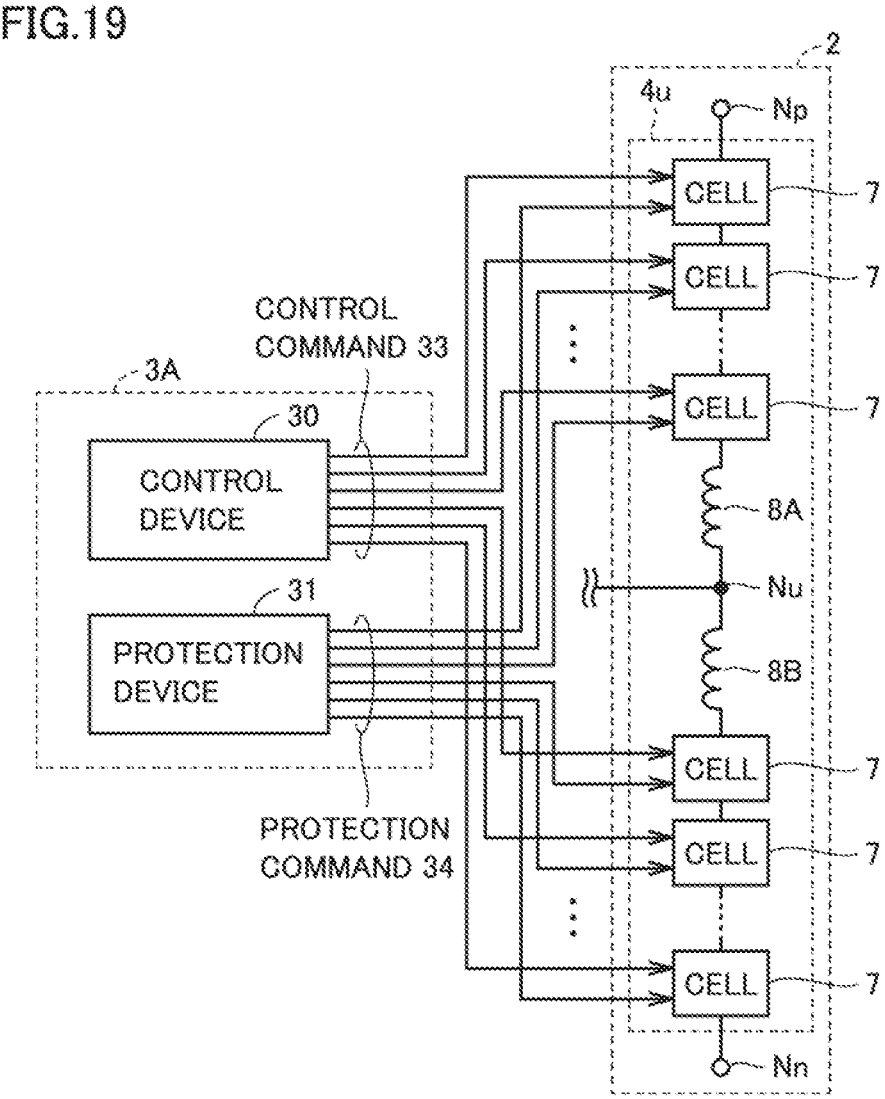
FIG. 19 is a block diagram showing a configuration of a power conversion device in Embodiment 8.

FIG. 19 is a block diagram showing a configuration of a power conversion device in Embodiment 8. The power conversion device in FIG. 19 differs from the power conversion device in FIG. 5 in that the former does not include repeating device 32.

Specifically, in the power conversion device in FIG. 19, control device 30 generates, for each converter cell 7, a set value of the gate drive signal as control command 33, and transmits the generated control command 33 to the corresponding converter cell 7. Protection device 31 in FIG. 19 generates common protection command 34 for converter cells 7, and transmits the generated protection command 34 to each converter cell 7. In other respects, FIG. 19 is similar to FIG. 5 in Embodiment 1. Therefore, the same or corresponding parts are denoted by the same reference characters, and the description thereof is not repeated.

In the power conversion device in FIG. 19, protection device 31 is provided independently of control device 30, and therefore, protection command 34 can be transmitted directly to each converter cell 7 without being influenced by control command 33. Accordingly, when overcurrent is detected, all of the converter cells can be stopped quickly.

The present embodiment may be combined with Embodiments 2, 4, 5. If at least one leg circuit 4 includes converter cells 7 of different types, a control device is provided for each type of converter cells 7 and control command 33 is transmitted from the associated control device to the converter cell 7, as in Embodiment 3.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 power conversion device; 2 power conversion circuitry; 3 control-and-protection command generator; 4u, 4v, 4w leg circuit; 5 upper arm; 6 lower arm; 7, 7FB, 7HB, 7TQB converter cell; 8A, 8B reactor; 9A, 9B arm current detection device; 10 AC voltage detection device; 11A, 11B DC voltage detection device; 12 AC circuit; 13 interconnection transformer; 14 DC circuit; 15, 15A, 15B control-and-protection command; 20FB, 20HB, 20TQB conversion circuit; 21 gate controller; 22A, 22B, 22C, 22D switching device; 23A, 23B, 23C, 23D diode; 24 DC capacitor; 26N, 26P input/output terminal; 30 control device; 30FB second controller; 30HB first controller; 31 protection device; 32 repeating device; 32FB second repeater; 32HB first repeater; 33, 33A, 33B control command; 34 protection command; 50 AC current determination device; 51 DC current determination device; 52 circulating current determination device; 90 AC circuit breaker; 91, 92 DC circuit breaker; low-potential-side DC terminal; Np high-potential-side DC terminal; T1 first period; T2 second period; T3 third period; TH1, TH2, TH3 threshold value

The invention claimed is:

1. A power conversion device configured to perform power conversion between a DC circuit and an AC circuit, the power conversion device comprising:
   power conversion circuitry including a plurality of converter cells connected in series to each other,
   the converter cells each including an energy storage device and being configured to be capable of discharging stored energy;
   a control device configured to generate, at a first interval, control commands for controlling operation of each of the converter cells;
   a protection device configured to generate, at a second interval shorter than the first interval protection commands for instructing whether to cause each of the converter cells to operate based on the control command or to stop operation of each of the converter cells regardless of the control commands; and
   a repeating device configured to generate, at a third interval shorter than the first interval, control-and-protection commands by combining a latest of the control commands and a latest of the protection commands, and output the generated control-and-protection command to each of the converter cells at the third interval.

2. The power conversion device according to claim 1, wherein the protection device is configured to generate the protection commands, based on at least whether current flowing in the plurality of converter cells is larger than a threshold value.

3. The power conversion device according to claim 1, wherein the control-and-protection commands include error detection information based on the protection commands.

4. The power conversion device according to claim 1, wherein the plurality of converter cells connected in series to each other include respective conversion circuits of a same bridge type.

5. The power conversion device according to claim 1, wherein
   the converter cells connected in series to each other include:
      a plurality of first converter cells including respective conversion circuits of a first bridge type; and
      a plurality of second converter cells including respective conversion circuits of a second bridge type different from the first bridge type,
   the repeating device includes:
      a first repeater configured to output the control-and-protection commands to each of the first converter cells; and
      a second repeater configured to output the control-and-protection commands to each of the second converter cells,
   the control device includes:
      a first controller configured to output, to the first repeater, the control commands for controlling operation of each of the first converter cells; and
      a second controller configured to output, to the second repeater, the control commands for controlling operation of each of the second converter cells, and
   the protection device is configured to output the protection commands as a common protection command to the first repeater and the second repeater.

6. The power conversion device according to claim 1, wherein
   the power conversion circuitry includes:
      a high-potential-side DC terminal and a low-potential-side DC terminal that are connected to the DC circuit; and
      a plurality of leg circuits corresponding to respective phases of the AC circuit and connected in parallel with each other between the high-potential-side DC terminal and the low-potential-side DC terminal,
   the leg circuits each include:
      a connecting part connected electrically to a corresponding one of the phases of the AC circuit;
      an upper arm including a plurality of the converter cells connected in series to each other between the connecting part and the high-potential-side DC terminal;
      a lower arm including a plurality of the converter cells connected in series to each other between the connecting part and the low-potential-side DC terminal;
      an upper arm current detection device configured to detect current flowing in the upper arm; and
      a lower arm current detection device configured to detect current flowing in the lower arm.

7. The power conversion device according to claim 6, wherein
the protection device includes an AC current determination device,
the AC current determination device is configured to determine whether a first determination condition is satisfied, the first determination condition being a condition that at least one of respective absolute values of currents flowing in respective upper arms of the leg circuits and respective absolute values of currents flowing in respective lower arms of the leg circuits is larger than a first threshold value, and
when the first determination condition is satisfied, the protection device outputs the protection command for stopping operation of each of the converter cells disposed in the power conversion circuitry.

8. The power conversion device according to claim 7, wherein
the protection device further includes a DC current determination device,
the DC current determination device is configured to calculate DC current flowing through the high-potential-side DC terminal and DC current flowing through the low-potential-side DC terminal, based on respective currents flowing in respective upper arms and respective lower arms of the leg circuits, and determine whether a second determination condition is satisfied, the second determination condition being a condition that at least one of an absolute value of the DC current flowing through the high-potential-side DC terminal and an absolute value of the DC current flowing through the low-potential-side DC terminal is larger than a second threshold value, and
when at least one of the first determination condition and the second determination condition is satisfied, the protection device outputs the protection command for stopping operation of each of the converter cells disposed in the power conversion circuitry.

9. The power conversion device according to claim 8, wherein
the protection device further includes a circulating current determination device,
the circulating current determination device is configured to calculate a plurality of circulating currents flowing in the respective leg circuits, based on respective currents flowing in respective upper arms and respective lower arms of the leg circuits, and determine whether a third determination condition is satisfied, the third determination condition being a condition that at least one of the plurality of circulating currents is larger than a third threshold value,
when at least one of the first determination condition, the second determination condition, and the third determination condition is satisfied, the protection device outputs the protection command for stopping operation of each of the converter cells disposed in the power conversion circuitry.

10. The power conversion device according to claim 8, wherein
an AC circuit breaker is connected between the AC circuit and the power conversion circuitry,
a DC circuit breaker is connected between the DC circuit and the power conversion circuitry,
the protection device outputs a trip signal to the AC circuit breaker when the first determination condition is satisfied, and
the protection device outputs a trip signal to the DC circuit breaker when the second determination condition is satisfied.

11. The power conversion device according to claim 8, wherein
the converter cells disposed in the power conversion circuitry each include a full-bridge-type conversion circuit, and
the converter cells are each configured to change connection of the full-bridge-type conversion circuit to output a reverse voltage from the converter cell when the second determination condition is satisfied.

12. The power conversion device according to claim 6, wherein the control device is configured to output the control command to the repeating device, wherein the control command includes an output voltage command value for a whole of the converter cells constituting the upper arm and an output voltage command value for a whole of the converter cells constituting the lower arm of each of the leg circuits.

13. A power conversion device for performing power conversion between a DC circuit and an AC circuit, the power conversion device comprising:
a power conversion circuitry including a plurality of converter cells connected in series to each other,
the converter cells each including an energy storage device and being configured to be capable of discharging stored energy;
a control device configured to generate a control command for controlling operation of each converter cell of the plurality of converter cells, and output the generated control command directly to each of the plurality of converter cells; and
a protection device configured to generate a common protection command for instructing whether to cause each of the converter cells to operate based on the control command or to stop operation of each of the converter cells regardless of the control command, and output the generated common protection command directly to each of the plurality of converter cells without being influenced by the control command.

14. A power conversion device configured to perform power conversion between a DC circuit and an AC circuit, the power conversion device comprising:
power conversion circuitry including a plurality of converter cells connected in series to each other,
the converter cells each including an energy storage device and being configured to be capable of discharging stored energy;
a control device configured to generate a control command for controlling operation of each of the converter cells;
a protection device configured to generate a protection command for causing each of the converter cells to operate or stopping operation of each of the converter cells;
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal, wherein
when at least one of a first determination condition representing detection of a fault in the AC circuit and a second determination condition representing detection of a fault in the DC circuit is satisfied, the protection device outputs the protection command for stopping operation of the converter cells, and at least one converter cell of the plurality of converter cells included in the power conversion circuitry includes a full-bridge-type conversion circuit, and the converter cell including the full-bridge-type conversion circuit is configured to change connection of the full-bridge-type conversion circuit to output a reverse voltage from the at least one converter cell when the second determination condition is satisfied.

15. The power conversion device according to claim 14, wherein when at least one of the first determination condition, the second determination condition, and a third determination condition regarding circulating current is satisfied, the protection device outputs the protection command for stopping operation of the converter cells.

* * * * *